US007583853B2

(12) United States Patent
Taylor et al.

(10) Patent No.: US 7,583,853 B2
(45) Date of Patent: Sep. 1, 2009

(54) IMAGE PROCESSING METHOD AND SYSTEM FOR MICROFLUIDIC DEVICES

(75) Inventors: Colin Jon Taylor, Burlingame, CA (US); Gang Sun, Cupertino, CA (US); Simant Dube, Berkeley, CA (US)

(73) Assignee: Fluidigm Corporation, South San Francisco, CA (US)

( * ) Notice: Subject to any disclaimer, the term of this patent is extended or adjusted under 35 U.S.C. 154(b) by 703 days.

(21) Appl. No.: 10/902,494

(22) Filed: Jul. 28, 2004

(65) Prior Publication Data
US 2005/0282175 A1    Dec. 22, 2005

Related U.S. Application Data

(60) Provisional application No. 60/490,712, filed on Jul. 28, 2003.

(51) Int. Cl.
*G06K 9/36* (2006.01)
(52) U.S. Cl. .................................. 382/276; 382/128
(58) Field of Classification Search .............. 378/23, 378/62, 98.12; 382/100, 128
See application file for complete search history.

(56) References Cited

U.S. PATENT DOCUMENTS

| 3,570,515 A | 3/1971 | Kinner |
| 3,747,628 A | 7/1973 | Holster et al. |
| 4,046,159 A | 9/1977 | Pegourie |
| 4,119,368 A | 10/1978 | Yamazaki |
| 4,153,855 A | 5/1979 | Feingold |
| 4,245,673 A | 1/1981 | Bouteille et al. |
| 4,434,704 A | 3/1984 | Surjaatmadja |
| 4,898,582 A | 2/1990 | Faste |
| 4,948,564 A | 8/1990 | Root et al. |
| 4,992,312 A | 2/1991 | Frisch |
| 5,085,562 A | 2/1992 | Van Lintel |
| 5,088,515 A | 2/1992 | Kamen |
| 5,096,388 A | 3/1992 | Weinberg |
| 5,126,115 A | 6/1992 | Fujita et al. |

(Continued)

FOREIGN PATENT DOCUMENTS

EP    0 592 094 A2    4/1994

(Continued)

OTHER PUBLICATIONS

"Biochips," Nature Biotechnology, vol. 18, Supplement 2000, pp. IT43-IT44, 2000.

(Continued)

*Primary Examiner*—Brian P Werner
*Assistant Examiner*—Claire Wang
(74) *Attorney, Agent, or Firm*—Townsend and Townsend and Crew LLP

(57) ABSTRACT

A method for processing an image of a microfluidic device. The method includes receiving a first image of a microfluidic device. The first image corresponds to a first state. Additionally, the method includes receiving a second image of the microfluidic device. The second image corresponds to a second state. Moreover, the method includes transforming the first image and the second image into a third coordinate space. Also, the method includes obtaining a third image based on at least information associated with the transformed first image and the transformed second image, and processing the third image to obtain information associated with the first state and the second state.

40 Claims, 23 Drawing Sheets

U.S. PATENT DOCUMENTS

| | | | |
|---|---|---|---|
| 5,164,558 A | 11/1992 | Huff et al. |
| 5,171,132 A | 12/1992 | Miyazaki |
| 5,224,843 A | 7/1993 | Van Lintel |
| 5,259,737 A | 11/1993 | Kamisuki et al. |
| 5,265,327 A | 11/1993 | Faris et al. |
| 5,290,240 A | 3/1994 | Horres, Jr. |
| 5,336,062 A | 8/1994 | Richter |
| 5,346,372 A | 9/1994 | Naruse et al. |
| 5,375,979 A | 12/1994 | Trah |
| 5,376,252 A | 12/1994 | Ekstrom |
| 5,400,741 A | 3/1995 | DeTitta et al. |
| 5,423,287 A | 6/1995 | Usami et al. |
| 5,529,465 A | 6/1996 | Zengerle et al. |
| 5,593,130 A | 1/1997 | Hansson et al. |
| 5,637,469 A | 6/1997 | Wilding et al. |
| 5,642,015 A | 6/1997 | Whitehead et al. |
| 5,659,171 A | 8/1997 | Young et al. |
| 5,660,370 A | 8/1997 | Webster |
| 5,681,024 A | 10/1997 | Lisec et al. |
| 5,705,018 A | 1/1998 | Hartley |
| 5,759,014 A | 6/1998 | Van Lintel |
| 5,775,371 A | 7/1998 | Pan et al. |
| 5,788,468 A | 8/1998 | Dewa et al. |
| 5,836,750 A | 11/1998 | Cabuz |
| 5,842,787 A | 12/1998 | Kopf-Sill et al. |
| 5,854,684 A | 12/1998 | Stabile et al. |
| 5,875,817 A | 3/1999 | Carter |
| 5,876,187 A | 3/1999 | Forster et al. |
| 5,876,675 A | 3/1999 | Kennedy |
| 5,885,470 A | 3/1999 | Parce et al. |
| 5,912,984 A | 6/1999 | Michael et al. |
| 5,932,100 A | 8/1999 | Yager et al. |
| 5,932,799 A | 8/1999 | Moles |
| 5,942,443 A | 8/1999 | Parce et al. |
| 6,007,309 A | 12/1999 | Hartley |
| 6,043,080 A | 3/2000 | Lipshutz et al. |
| 6,081,577 A * | 6/2000 | Webber ...................... 378/23 |
| 6,123,769 A | 9/2000 | Sanjoh |
| 6,155,282 A | 12/2000 | Zachary et al. |
| 6,165,694 A | 12/2000 | Liu |
| 6,174,365 B1 | 1/2001 | Sanjoh |
| 6,174,675 B1 | 1/2001 | Chow et al. |
| 6,296,673 B1 | 10/2001 | Santarsiero et al. |
| 6,345,502 B1 | 2/2002 | Tai et al. |
| 6,409,832 B2 | 6/2002 | Weigl et al. |
| 6,728,424 B1 | 4/2004 | Zhu et al. |
| 6,767,706 B2 | 7/2004 | Quake et al. |
| 6,797,056 B2 | 9/2004 | David |
| 6,977,145 B2 | 12/2005 | Fouillet et al. |
| 7,123,569 B2 * | 10/2006 | Edwards ..................... 369/100 |
| 2001/0027745 A1 | 10/2001 | Weigl et al. |
| 2001/0041357 A1 | 11/2001 | Fouillet et al. |
| 2002/0037499 A1 | 3/2002 | Quake et al. |
| 2002/0145231 A1 | 10/2002 | Quake et al. |
| 2002/0195050 A1 | 12/2002 | David |
| 2003/0027225 A1 | 2/2003 | Wada et al. |
| 2003/0061687 A1 | 4/2003 | Hansen et al. |
| 2003/0096310 A1 | 5/2003 | Hansen et al. |
| 2004/0115731 A1 | 6/2004 | Hansen et al. |
| 2005/0019794 A1 | 1/2005 | Nassef et al. |
| 2005/0062196 A1 | 3/2005 | Hansen et al. |
| 2005/0201901 A1 | 9/2005 | Grossman et al. |
| 2005/0205005 A1 | 9/2005 | Hansen et al. |
| 2005/0214173 A1 | 9/2005 | Facer et al. |
| 2005/0229839 A1 | 10/2005 | Quake et al. |

FOREIGN PATENT DOCUMENTS

| | | |
|---|---|---|
| EP | 0 703 364 A1 | 3/1996 |
| EP | 0 706 004 A2 | 4/1996 |
| EP | 0 779 436 A2 | 6/1997 |
| EP | 0 829 360 A2 | 3/1998 |
| EP | 0 845 603 A1 | 6/1998 |
| EP | 0 999 055 A2 | 5/2000 |
| GB | 2 155 152 A | 9/1985 |
| GB | 2 308 460 A | 6/1997 |
| WO | WO 98/07069 A1 | 2/1998 |
| WO | WO 99/00655 A2 | 1/1999 |
| WO | WO 99/04361 A1 | 1/1999 |
| WO | WO 99/17093 A1 | 4/1999 |
| WO | WO 99/52633 A1 | 10/1999 |
| WO | WO 00/00678 A1 | 1/2000 |
| WO | WO 00/43748 A1 | 7/2000 |
| WO | WO 00/60345 | 10/2000 |
| WO | WO 00/60345 A1 | 10/2000 |
| WO | WO 01/09595 A2 | 2/2001 |
| WO | WO 01/09595 A3 | 2/2001 |
| WO | WO 02/23467 | 3/2002 |

OTHER PUBLICATIONS

"Chapter 9: Microfluidic Devices," Micromachined Transducers Sourcebook, pp. 779-882, 1998.

"Last Chance for Micromachines," The Economist Technology Quarterly, 8 pages, Dec. 7, 2000.

"The Liver Chip," Technology Review, pp. 64-67, Mar. 2003.

Abola, Enrique et al., "Automation Of X-Ray Crystallography," Nature Structural Biology, Structural Genomics Supplement, pp. 973-977, Nov. 2000.

Affholter, Joseph et al., "Engineering A Revolution," Chemistry in Britain, pp. 48-51, Apr. 1999.

Ahn, Chong H. et al., "Fluid Micropumps Based On Rotary Magnetic Actuators," Proceedings of 1995 IEEE Micro Electro Mechanical Systems Workshop (MEMS '95), Amsterdam, Netherlands, pp. 408-412, Jan. 29-Feb. 2, 1995.

Andersen, Gregers Rom et al., "A Spreadsheet Approach To Automated Protein Crystallization," Journal of Applied Crystallography, vol. 29, pp. 236-240, 1996.

Anderson, Rolfe C. et al., "Microfluidic Biochemical Analysis System," Transducers '97, 1997 International Conference on Solid-State Sensors and Actuators, Chicago, Illinois, pp. 477-480, Jun. 16-19, 1997.

Angell, James B. et al., "Silicon Micromechanical Devices," Scientific American, pp. cover, 44-55, Apr. 1983.

Armani, Deniz et al., "Re-Configurable Fluid Circuits By PDMS Elastomer Micromachining," IEEE Int. Conf. Micro Electro Mech. Syst. Tech. Digest, vol. 12, pp. 222-227, 1999.

Arnold, Frances H., "Design By Directed Evolution," Accounts of Chemical Research, vol. 31, No. 3, pp. 125-131, 1998.

Ashkin, A. et al., "Optical Trapping And Manipulation Of Single Cells Using Infrared Laser Beams," Nature, vol. 330, No. 24, pp. 769-771, Dec. 31, 1987.

Ashkin, A. et al., "Optical Trapping And Manipulation Of Viruses And Bacteria," Science, vol. 235, pp. 1517-1520, Mar. 20, 1987.

Ballantyne, J. P. et al., "Selective Area Metallization By Electron-Beam Controlled Direct Metallic Deposition," J. Vac. Sci. Technol., vol. 10, No. 6, pp. 1094-1097, Nov. 1973.

Belgrader, Phillip et al., "Rapid Pathogen Detection Using A Microchip PCR Array Instrument," Clinical Chemistry, vol. 44, No. 10, pp. 2191-2194, 1998.

Benard, W. L. et al., "A Titanium-Nickel Shape-Memory Alloy Actuated Micropump," Transducers '97, 1997 International Conference on Solid-State Sensors and Actuators, Chicago, Illinois, pp. 361-364, Jun. 16-19, 1997.

Berry, Michael B., "Protein Crystallization: Theory And Practice," Excerpts from Doctoral Thesis, 36 pages, Sep. 17, 1995.

Black, Harvey, "Tiny Technology Promises Tremendous Profits," The Scientist, vol. 15, No. 21, 4 pages, Oct. 29, 2001.

Bloomstein, T. M. et al., "Laser-Chemical Three-Dimensional Writing For Microelectromechanics And Application To Standard-Cell Microfluidics," J. Vac. Sci. Technol. B, vol. 10, No. 6, pp. 2671-2674, Nov. 1992.

Bousse, Luc et al., "Electrokinetically Controlled Microfluidic Analysis Systems," Annu. Rev. Biophys. Biomol. Struct., vol. 29, pp. 155-181, 2000.

Brechtel, R. et al., "Control Of The Electroosmotic Flow By Metal-Salt-Containing Buffers," Journal of Chromatography A, vol. 716, pp. 97-105, 1995.

Brush, Michael, "Automated Laboratories," The Scientist, vol. 13, No. 4, 10 pages, Feb. 15, 1999.

Bryzek, Janusz et al., "Micromachines On The March", IEEE Spectrum, vol. 31, No. 5, pp. 20-31, May 1994.

Buchaillot, Lionel et al., "Silicon Nitride Thin Films Young's Modulus Determination By An Optical Non Destructive Method," Jpn. J. Appl. Phys., vol. 36, Part 2, No. 6B, pp. L794-L797, Jun. 15, 1997.

Buican, Tudor N. et al., "Automated Single-Cell Manipulation And Sorting By Light Trapping," Applied Optics, vol. 26, No. 24, pp. 5311-5316, Dec. 15, 1987.

Burbaum, Jonathan J. et al., "New Technologies For High-Throughput Screening," Current Opinion in Chemical Biology, vol. 1, pp. 72-78, 1997.

Calkins, Kathryn, "Mycometrix: Rubber Chips," BioCentury, 2 pages, Oct. 16, 2000.

Carter, Charles W. Jr. et al., "Protein Crystallization Using Incomplete Factorial Experiments," Journal of Biological Chemistry, vol. 254, No. 23, pp. 12219-12223, Dec. 10, 1979.

Carter, Charles W. Jr. et al., "Statistical Design Of Experiments For Protein Crystal Growth And The Use Of A Precrystallization Assay," Journal of Crystal Growth, vol. 90, pp. 60-73, 1998.

Chang, Jun Keun et al., "Functional Integration Of Serial Dilution And Capillary Electrophoresis On A PDMS Microchip," Biotechnology and Bioprocess Engineering, vol. 8, No. 4, pp. 233-239, 2003.

Chayen, Naomi E., "A Novel Technique To Control The Rate of Vapour Diffusion, Giving Larger Protein Crystals," Journal of Applied Crystallography, vol. 30, pp. 198-202, 1997.

Chayen, Naomi E. et al., "An Automated System For Micro-Batch Protein Crystallization And Screening," J. Appl. Cryst., vol. 23, pp. 297-302, 1990.

Chayen, Naomi E., "Comparative Studies of Protein Crystallization By Vapour-Diffusion And Microbatch Techniques," Acta Cryst., vol. D54, pp. 8-15, 1998.

Chayen, Naomi E. et al., "Microbatch Crystallization Under Oil—A New Technique Allowing Many Small-Volume Crystallization Trials," Journal of Crystal Growth, vol. 122, pp. 176-180, 1992.

Chayen, Naomi E. et al., "New Developments Of The IMPAX Small-Volume Automated Crystallization System," Acta Cryst., vol. D50, pp. 456-458, 1994.

Chayen, Naomi E., "Protein Crystallization For Genomics: Throughput Versus Output," Journal of Structural and Functional Genomics, vol. 4, pp. 115-120, 2003.

Chayen, Naomi E., "The Role Of Oil In Macromolecular Crystallisation," Structure, vol. 5, pp. 1269-1274, Oct. 15, 1997.

Chen, Chihchen et al., "Gray-Scale Photolithography Using Microfluidic Photomasks," PNAS, vol. 100, No. 4, pp. 1499-1504, Feb. 18, 2003.

Chiu, Daniel T. et al., "Patterned Deposition Of Cells And Proteins Onto Surfaces By Using Three-Dimensional Microfluidic Systems," PNAS, vol. 97, No. 6, pp. 2408-2413, Mar. 14, 2000.

Chou, Hou-Pu et al., "A Microfabricated Device For Sizing And Sorting DNA Molecules," Proc. Natl. Acad. Sci., vol. 96, pp. 11-13, Jan. 1999.

Chou, Hou-Pu et al., "A Microfabricated Rotary Pump," Biomedical Microdevices, vol. 3, No. 4, pp. 323-330, 2001.

Chou, Hou-Pu et al., "Integrated Elastomer Fluidic Lab-On-A-Chip-Surface Patterning And DNA Diagnostics," Proceedings of the Solid State Actuator and Sensor Workshop, Hilton Head, South Carolina, 4 pages, 2000.

Chou, Hou-Pu et al., "Multiple Disease Diagnostics On A Single Chip," Biophysics Lab, Caltech, pp. 1-4, Mar. 1, 2000.

Cox, M. Jane et al., "Experiments With Automated Protein Crystallization," J. Appl. Cryst., vol. 20, pp. 366-373, 1987.

D'Arcy, Allan et al., "The Adavantages Of Using A Modified Microbatch Method For Rapid Screening Of Protein Crystallization Conditions," Acta Crystallographica, vol. D59, pp. 1-3, 2003.

Delamarche, Emmanuel et al., "Patterned Delivery Of Immunoglobulins To Surfaces Using Microfluidic Networks," Science, vol. 276, pp. 779-781, May 2, 1997.

Ducruix A. et al., "Crystallization Of Nucleic Acids And Proteins—A Practical Approach," IRL Press, pp. 2 cover pages and 73-98, 1992.

Duffy, David C. et al., "Patterning Electroluminescent Materials With Feature Sizes As Small As 5 μm Using Elastomeric Membranes As Masks For Dry Lift-Off," Advanced Materials, vol. 11, No. 7, pp. 546-552, 1999.

Duffy, David C. et al., "Rapid Prototyping Of Microfluidic Switches In Poly(dimethyl siloxane) And Their Actuation By Electro-Osmotic Flow," J. Micromech. Microeng., vol. 9, pp. 211-217, 1999.

Duffy, David C. et al., "Rapid Prototyping Of Microfluidic Systems In Poly(dimethylsiloxane)," Analytical Chemistry, vol. 70, No. 23, pp. 4974-4984, Dec. 1, 1998.

Effenhauser, Carlo S. et al., "Integrated Capillary Electrophoresis On Flexible Silicone Microdevices: Analysis Of DNA Restriction Fragments And Detection Of Single DNA Molecules On Microchips," Analytical Chemistry, vol. 69, No. 17, pp. 3451-3457, Sep. 1, 1997.

Effenhauser, Carlo S. et al., "Integrated Chip-Based Capillary Electrophoresis," Electrophoresis, vol. 18, pp. 2203-2213, 1997.

Eiselé, Jean-Luc, "Preparation Of Protein Crystallization Buffers With A Computer-Controlled Motorized Pipette—PIPEX," J. Appl. Cryst., vol. 26, pp. 92-96, 1993.

Eyal, Shulamit et al., "Velocity-Independent Microfluidic Flow Cytometry," Electrophoresis, vol. 23, pp. 2653-2657, 2002.

Fahrenberg, J. et al., "A Microvalve System Fabricated By Thermoplastic Molding," J. Micromech. Microeng., vol. 5, pp. 169-171, 1995.

Fenna, R. E., "Crystallization Of Human α-Lactalbumin," J. Mol. Biol., vol. 161, pp. 211-215, 1982.

Fettinger, J. C. et al., "Stacked Modules For Micro Flow Systems In Chemical Analysis: Concept And Studies Using An Enlarged Model," Sensors and Actuators B, vol. 17, pp. 19-25, 1993.

Fitzgerald, Deborah A., "Making Every Nanoliter Count," The Scientist, vol. 15, No. 21, 8 pages, Oct. 29, 2001.

Folch, A. et al., "Molding Of Deep Polydimethylsiloxane Microstructures For Microfluidics And Biological Applications," Journal of Biomechanical Engineering, vol. 121, pp. 28-34, Feb. 1999.

Fox, Kristin M. et al., "Crystallization Of Old Yellow Enzyme Illustrates An Effective Strategy For Increasing Protein Crystal Size," J. Mol. Biol., vol. 234, pp. 502-507, 1993.

Fu, Anne Y. et al., "A Microfabricated Fluorescence-Activated Cell-Sorter," Nature Biotechnology, vol. 17, pp. 1109-1111, Nov. 1999.

Gao, Jun et al., "Integrated Microfluidic System Enabling Protein Digestion, Peptide Separation, And Protein Identification," Analytical Chemistry, vol. 73, No. 11, pp. 2648-2655, Jun. 1, 2001.

García-Ruiz, J. M. et al., "Agarose As Crystallization Media For Proteins I: Transport Processes," Journal of Crystal Growth, vol. 232, pp. 165-172, 2001.

García-Ruiz, J. M. et al., "Investigations On Protein Crystal Growth By The Gel Acupuncture Method," Acta Cryst., vol. D50, pp. 484-490, 1994.

Garno, Jayne C. et al., "Production Of Periodic Arrays Of Protein Nanostructures Using Particle Lithography," Langmuir, vol. 18, No. 21, pp. 8186-8192, 2002.

Gass, V. et al., "Integrated Flow-Regulated Silicon Micropump," Sensors and Actuators A, vol. 43, pp. 335-338, 1994.

Gerlach, Torsten, "Pumping Gases By A Silicon Micro Pump With Dynamic Passive Valves," Transducers '97, 1997 International Conference on Solid-State Sensors and Actuators, Chicago, Illinois, pp. 357-360, Jun. 16-19, 1997.

Goll, C. et al., "Microvalves With Bistable Buckled Polymer Diaphragms," J. Micromech. Microeng., vol. 6, pp. 77-79, 1996.

Gravesen, Peter et al., "Microfluidics-A Review," J. Micromech. Microeng., vol. 3, pp. 168-192, 1993.

Greene, Chana, "Characterizing The Properties Of PDMS," pp. 1-11, Summer 2000.

Grover, William H. et al., "Monolithic Membrane Valves And Diaphragm Pumps For Practical Large-Scale Integration Into Glass Microfluidic Devices," Sensors and Actuators B, vol. 89, pp. 315-323, 2003.

Guérin, L. J. et al., "Simple And Low Cost Fabrication Of Embedded Micro-Channels By Using A New Thick-Film Photoplastic," Transducers '97, 1997 International Conference on Solid-State Sensors and Actuators, Chicago, Illinois, pp. 1419-1422, Jun. 18-19, 1997.

Hanes, Jozef, et al., "In Vitro Selection And Evolution Of Functional Proteins By Using Ribosome Display," Proc. Natl. Acad. Sci. USA, vol. 94, pp. 4937-4942, May 1997.

Hansen, Carl. L. et al., "A Robust And Scalable Microfluidic Metering Method That Allows Protein Crystal Growth By Free Interface Diffusion," PNAS, vol. 99, No. 26, pp. 16531-16536, Dec. 24, 2002.

Hansen, Carl. L. et al., "Systematic Investigation Of Protein-Phase Behavior With A Microfluidic Formulator," PNAS Early Edition, 6 pages, 2004.

Harrison, D. Jed et al., "Micromachining A Miniaturized Capillary Electrophoresis-Based Chemical Analysis System On A Chip," Science, vol. 261, pp. 895-897, Aug. 13, 1993.

Hicks, Jennifer, "Genetics And Drug Discovery Dominate Microarray Research," R&D Magazine, pp. 28-33, Feb. 1999.

Hoffmuller, Ulrich et al., "In Vitro Evolution And Selection Of Proteins: Ribosome Display For Larger Libraries," Angew. Chem. Int. Ed., vol. 37, No. 23, pp. 3241-3243, 1998.

Hofmann, Oliver et al., "Modular Approach To Fabrication Of Three-Dimenisonal Microchannel Systems In PDMS—Application To Sheath Flow Microchips," Lab on a Chip, vol. 1, pp. 108-114, 2001.

Hong, Jong Wook et al., "A Nanoliter-Scale Nucleic Acid Processor With Parallel Architecture," Nature Biotechnology, vol. 22, No. 4, pp. 1-5, Apr. 2004.

Horn, Howard, "Lab Chips Sector: Microtechnologies Are Changing Healthcare And More," Life Sciences, pp. 19-21, Mar. 20, 2001.

Hornbeck, Larry J. et al., "Bistable Deformable Mirror Device," Spatial Light Modulators and Applications 1988 Technical Digest Series, vol. 8, Postconference Edition, pp. cover, 107-110, Jun. 15-17, 1988.

Hosokawa, Kazuo et al., "A Microfluidic Device For Mixing Of Capillary-Driven Liquids," IEEJ Trans. SM, vol. 123, No. 1, pp. 23-24, 2003.

Hosokawa, Kazuo et al., "Handling of Picoliter Liquid Samples in A Poly(dimethylsiloxane)-Based Microfluidic Device," Analytical Chemistry, vol. 71, No. 20, pp. 4781-4785, Oct. 15, 1999.

Ikuta, Koji et al., "Three Dimensional Micro Integrated Fluid Systems (MIFS) Fabricated By Stereo Lithography," IEEE, pp. 1-6, 1994.

Jacobson, Stephen C. et al., "High-Speed Separations On A Microchip," Analytical Chemistry, vol. 66, No. 7, pp. 1114-1118, Apr. 1, 1994.

Jacobson, Stephen C. et al., "Microfluidic Devices For Electrokinetically Driven Parallel And Serial Mixing," Analytical Chemistry, vol. 71, No. 20, pp. 4455-4459, Oct. 15, 1999.

Jerman, Hal, "Electrically-Activated, Normally-Closed Diaphragm Valves," Transducers '91, 1991 International Conference on Solid-State Sensors and Actuators, pp. cover, 1045-1048, 1991.

Jo, Byung-Ho et al., "Fabrication Of Three-Dimensional Microfluidic Systems By Stacking Molded Polydimethylsiloxane (PDMS) Layers" SPIE, vol. 3877, pp. 222-229, Sep. 1999.

Jo, Byung-Ho et al., "Three-Dimensional Micro-Channel Fabrication In Polydimethylsiloxane (PDMS) Elastomer," Journal of Microelectromechanical Systems, vol. 9, No. 1, pp. 76-81, Mar. 2000.

Juárez-Martínez, G. et al., "High-Throughput Screens For Postgenomics: Studies Of Protein Crystallization Using Microsystems Technology," Analytical Chemistry, vol. 74, No. 14, pp. 3505-3510, Jul. 15, 2002.

Jung, D. R. et al., "Chemical And Physical Interactions At Metal/Self-Assembled Organic Monolayer Interfaces," pp. 1-54, 1994.

Kagan, C. R., "Organic-Inorganic Hybrid Materials As Semiconducting Channels in Thin-Film Field-Effect Transistors," Science, vol. 286, pp. 945-947, Oct. 29, 1999.

Kamentsky, Louis A. et al., "Spectrophotometer: New Instrument For Ultrarapid Cell Analysis," Science, vol. 150, pp. 630-631, Oct. 29, 1965.

Kamholz, Andrew Evan et al., "Quantitative Analysis Of Molecular Interaction In A Microfluidic Channel: The T-Sensor," Analytical Chemistry, vol. 71, No. 23, pp. 5340-5347, Dec. 1, 1999.

Kapur, Ravi et al., "Fabrication And Selective Surface Modification Of 3-Dimensionally Textured Biomedical Polymers From Etched Silicon Substrates," Journal of Biomedical Materials Research, vol. 33, pp. 205-216, 1996.

Kenis, Paul J. A. et al., "Microfabrication Inside Capillaries Using Multiphase Laminar Flow Patterning," Science, vol. 285, pp. 83-85, Jul 2, 1999.

Khoo, Melvin et al., "A Novel Micromachined Magnetic Membrane Microfluid Pump," pp. 1-4, no date.

Kim, Enoch et al., "Micromolding in Capillaries: Applications In Materials Science," J. Am. Chem. Soc., vol. 118, No. 24, pp. 5722-5731, 1996.

Kim, Enoch et al., "Polymer Microstructures Formed By Moulding in Capillaries," Nature, vol. 376, pp. 581-584, Aug. 17, 1995.

Kirk-Othmer, "Concise Encyclopedia of Chemical Technology," John Wiley & Sons, 5 pages, 1985.

Kopp, Martin U. et al., "Chemical Amplification: Continuous-Flow PCR On A Chip," Science, vol. 280, pp. 1046-1048, May 15, 1998.

Kuhn, Lawrence et al., "Silicon Charge Electrode Array For Ink Jet Printing," IEEE Transactions on Electron Devices, vol. ED-25, No. 10, pp. 1257-1260, Oct. 1978.

Kuhn, Peter et al., "The Genesis Of High-Throughput Structure-Based Drug Discovery Using Protein Crystallography," Current Opinion in Chemical Biology, vol. 6, pp. 704-710, 2002.

Kumar, Amit et al., "Features Of Gold Having Micrometer To Centimeter Dimensions Can Be Formed Through A Combination Of Stamping With An Elastomeric Stamp And An Alkanethiol 'Ink' Followed By Chemical Etching," Appl. Phys. Lett., vol. 63, No. 14, pp. 2002-2004, Oct. 4, 1993.

Kumar, Amit et al., "Patterning Self-Assembled Monolayers: Applications In Materials Science," Langmuir, vol. 10, pp. 1498-1511, 1994.

Kwong, Peter D. et al., "Probability Analysis Of Variational Crystallization And Its Application To gp120, The Exterior Envelope Glycoprotein Of Type 1 Human Immunodeficiency Virus (HIV-1)," Journal of Biological Chemistry, vol. 274, No. 7, pp. 4115-4123, Feb. 12, 1999.

Kwong, Peter D. et al., "Structure Of An HIV gp 120 Envelope Glycoprotein In Complex With The CD4 Receptor And A Neutralizing Human Antibody," Nature, vol. 393, pp. 648-659, Jun. 18, 1998.

Lagally, Eric T. et al., "Fully Integrated PCR-Capillary Electrophoresis Microsystem For DNA Analysis," Lab On A Chip, vol. 1, pp. 102-107, 2001.

Lagally, Eric T. et al., "Monolithic Integrated Microfluidic DNA Amplification And Capillary Electrophoresis Analysis System," Sensors and Actuators B, vol. 63, pp. 138-146, 2000.

Lagally, E. T. et al., "Single-Molecule DNA Amplification And Analysis In An Integrated Microfluidic Device," Analytical Chemistry, vol. 73, No. 3, pp. 565-570, Feb. 1, 2001.

Lammerink, T. S. J. et al., "Modular Concept For Fluid Handling Systems," IEEE, pp. 389-394, 1996.

Li, Paul C. H. et al., "Transport, Manipulation, And Reaction Of Biological Cells On-Chip Using Electrokinetic Effects," Analytical Chemistry, vol. 69, No. 8, pp. 1564-1568, Apr. 15, 1997.

Licklider, Larry et al., "A Micromachined Chip-Based Electrospray Source For Mass Spectrometry," Analytical Chemistry, vol. 72, No. 2, pp. 367-375, Jan. 15, 2000.

Lin, L. Y. et al., "Free-Space Micromachined Optical Switches For Optical Networking," IEEE Journal of Selected Topics in Quantum Electronics, vol. 5, No. 1, pp. 4-9, Jan. 1999.

Lin, H. et al., "Convective-Diffusive Transport in Protein Crystal Growth," Journal of Crystal Growth, vol. 151, pp. 153-162, 1995.

Liu, Jian et al., "A Nanoliter Rotary Device For Polymerase Chain Reaction," Electrophoresis, vol. 23, pp. 1531-1536, 2002.

López-Jaramillo, F. J. et al., "Crystallization And Cryocrystallography Inside X-ray Capillaries," Journal of Applied Crystallography, vol. 34, pp. 365-370, 2001.

Lötters, J C et al., "The Mechanical Properties Of The Rubber Elastic Polymer Polydimethylsiloxane For Sensor Applications," J. Micromech. Microeng., vol. 7, pp. 145-147, 1997.

Lucy, Charles A. et al., "Characterization Of The Cationic Surfactant Induced Reversal Of Electroosmotic Flow In Capillary Electrophoresis," Anal. Chem., vol. 68, pp. 300-305, 1996.

Luft, Joseph R. et al., "A Method To Produce Microseed Stock For Use In The Crystallization Of Biological Macromolecules," Acta Cryst., vol. D55, pp. 988-993, 1999.

Luft, Joseph R. et al., "Kinetic Aspects Of Macromolecular Crystallization," Methods in Enzymology, vol. 276, pp. 110-131, 1997.

Luft, Joseph R. et al., "Macromolecular Crystallization In A High Throughput Laboratory—The Search Phase," Journal of Crystal Growth, vol. 232, pp. 591-595, 2001.

Luft, Joseph R. et al., "Microbatch Macromolecular Crystallization In Micropipettes," Journal of Crystal Growth, vol. 196, pp. 450-455, 1999.

Maluf, N., "An Introduction To Microelectromechanical Systems Engineering," Artech House Publishers, Boston London, pp. 42-45, Dec. 1999.

Manz, A. et al., "Micromachining Of Monocrystalline Silicon And Glass For Chemical Analysis Systems," Trends in Analytical Chemistry, vol. 10, No. 5, pp. 144-149, 1991.

Marshall, Sid, "Fundamental Changes Ahead For Lab Instrumentation," R&D Magazine, 5 pages, Feb. 1999.

Marsili, Ray, "Lab-On-A-Chip Poised To Revolutionize Sample Prep," R&D Magazine, 5 pages, Feb. 1999.

McDonald, J. Cooper et al., "Fabrication Of Microfluidic Systems In Poly(dimethylsiloxane)," Electrophoresis, vol. 21, pp. 27-40, 2000.

McDonald, J. Cooper et al., "Poly(dimethylsiloxane) As A Material For Fabricating Microfluidic Devices," Accounts of Chemical Research, vol. 35, No. 7, pp. 491-499, 2002.

McPherson, Alexander, "Crystallization Of Macromolecules: General Principles," Methods in Enzymology, vol. 114, pp. 112-120, 1985.

McPherson, Alexander, "Crystallization Of Proteins By Variation Of pH Or Temperature," Methods in Enzymology, vol. 114, pp. 125-127, 1985.

McPherson, Alexander et al., "Use Of Polyethylene Glycol In The Crystallization Of Macromolecules," Methods in Enzymology, vol. 114, pp. 120-125, 1985.

Miller, Teresa Y. et al., "A Comparison Between Protein Crystals Grown With Vapor Diffusion Methods in Microgravity And Protein Crystals Using a Gel Liquid-Liquid Diffusion Ground-Based Method," Journal of Crystal Growth, vol. 122, pp. 306-309, 1992.

Morris, Daniel W. et al., "Automation Of Protein Crystallization Trials: Use Of A Robot To Deliver Reagents To A Novel Multi-Chamber Vapor Diffusion Plate," BioTechniques, vol. 7, No. 5, pp. 522-527, 1989.

Muller Richard S. et al., "Surface-Micromachined Microoptical Elements And Systems," Proceedings of the IEEE, vol. 86, No. 8, pp. 1705-1720, Aug. 1998.

Nerad, B. A. et al., "Ground-Based Experiments On The Minimization Of Convection During The Growth Of Crystals From Solution," Journal of Crystal Growth, vol. 75, pp. 591-608, 1986.

Ng, Jessamine M. K. et al., "Components For Integrated Poly(Dimethylsiloxane) Microfluidic Systems," Electrophoresis, vol. 23, pp. 3461-3473, 2002.

Nollert, Peter et al., "Crystallization Of Membrane Proteins in Cubo," Methods in Enzymology, vol. 343, pp. 183-199, 2002.

Oldfield, T. J. et al., "A Flexible Approach To Automated Protein Crystallization," J. Appl. Cryst., vol. 24, pp. 255-260, 1991.

Oleschuk, Richard D. et al., "Analytical Microdevices For Mass Spectrometry," Trends In Analytical Chemistry, vol. 19, No. 6., pp. 379-388, 2000.

Olsson, Anders et al., "Simulation Studies Of Diffuser And Nozzle Elements For Valve-Less Micropumps," Transducers '97, 1997 International Conference on Solid-State Sensors and Actuators, Chicago, Illinois, pp. 1039-1042, Jun. 16-19, 1997.

Pethig, Ronald et al., "Applications Of Dielectrophoresis In Biotechnology," Tibtech, vol. 15, pp. 426-432, Oct. 1997.

Qin, Dong et al., "Elastomeric Light Valves;" Adv. Mater., vol. 9, No. 5, pp. 407-410, 1997.

Qin, Dong et al., "Photolithography With Transparent Reflective Photomasks," J. Vac. Sci. Technol. B, vol. 16, No. 1, pp. 98-103, Jan. 1998.

Quake, Stephen R. et al., "From Micro- To Nanofabrication With Soft Materials," Science, vol. 290, pp. 1536-1540, Nov. 24, 2000.

Rapp, R. et al., "LIGA Micropump For Gases And Liquids," Sensors and Actuators A, vol. 40, pp. 57-61, Jan. 1994.

Reshetnyak, I. I., "Characteristics Of The Influence Of Ultrasound On The Crystallization Kinetics In Small-Volume Solutions," Sov. Phys. Acoust., vol. 21, No. 1, pp. 61-63, Jul. 1975.

Roberts, Richard W. et al., "RNA-Peptide Fusions For The In Vitro Selection Of Peptides And Proteins," Proc. Natl. Acad. Sci. USA, vol. 94, pp. 12297-12302, Nov. 1997.

Roylance, Lynn Michelle et al., "A Batch-Fabricated Silicon Accelerometer," IEEE Transactions on Electron Devices, vol. ED-26, No. 12, pp. 1911-1917, Dec. 1979.

Rubin, Byron et al., "Minimal Intervention Robotic Protein Crystallization," Journal of Crystal Growth, vol. 110, pp. 156-163, 1991.

Rummel, Gabriele et al., "Lipidic Cubic Phases: New Matrices For The Three-Dimensional Crystallization Of Membrane Proteins," Journal of Structural Biology, vol. 121, pp. 82-91, 1998.

Sadaoui, Nouredine et al., "TAOS: An Automatic System For Protein Crystallization," Journal of Applied Crystallography, vol. 27, pp. 622-626, 1994.

Salemme, F. R., "A Free Interface Diffusion Technique For The Crystallization Of Proteins For X-Ray Crystallography," Archives of Biochemistry and Biophysics, vol. 151, pp. 533-539, 1972.

Sandia National Laboratories, "Electro Microfluidic Dual In-Line Package (EMDIP)," 2 pages, no date.

Sanjoh, Akira et al., "Spatiotemporal Protein Crystal Growth Studies Using Microfluidic Silicon Devices," Journal of Crystal Growth, vol. 196, pp. 691-702, 1999.

Santarsiero, B. D. et al., "An Approach To Rapid Protein Crystallization Using Nanodroplets," Journal of Applied Crystallography, vol. 35, pp. 278-281, 2002.

Sasserath, J. et al., "Rapid Prototyping And Development Of Microfluidic And BioMEMS Devices," IVD Technology, 12 pages, Jun. 2002.

Schasfoort, Richard B. M. et al., "Field-Effect Flow Control For Microfabricated Fluidic Networks," Science, vol. 286, pp. 942-945, Oct. 29, 1999.

Schueller, Olivier J. A. et al., "Fabrication Of Glassy Carbon Microstructures By Soft Lithography," Sensors and Acutuators A, vol. 72, pp. 126-139, 1999.

Shoji, Shuichi, "Fluids For Sensor Systems," Topics in Current Chemistry, vol. 194, pp. 163-188, 1998.

Shoji, Shuichi et al., "Smallest Dead Volume Microvalves For Integrated Chemical Analyzing Systems," Transducers '91, 1991 International Conference on Solid-State Sensors and Actuators, San Francisco, California, pp. cover, 1052-1055, 1991.

Sklar, Larry A. et al., Sample Handling For Kinetics And Molecular Assembly In Flow Cytometry, SPIE, vol. 3256, pp. 144-153, 1998.

Smits, J.G., "Piezoelectric Micropump With Three Valves Working Peristaltically," Sensors and Actuators, vol. A21-A23, pp. 203-206, 1990.

Snook, Christopher F. et al., "Use Of A Crystallization Robot To Set Up Sitting-Drop Vapor-Diffusion Crystallization And in situ Crystallization Screens," Journal of Applied Crystallography, vol. 33, pp. 344-349, 2000.

Sohn, L. L. et al., "Capacitance Cytometry: Measuring Biological Cells One By One," PNAS, vol. 97, No. 20, pp. 10687-10690, Sep. 26, 2000.

Soriano, Thierry M. B. et al., "ASTEC: An Automated System For Sitting-Drop Protein Crystallization," Journal of Applied Crystallography, vol. 26, pp. 558-562, 1993.

Stevens, Raymond C., "High-Throughput Protein Crystallization," Current Opinion in Structural Biology, vol. 10, pp. 558-563, 2000.

Stevens, Raymond C., "The Cost And Value Of Three-Dimensional Protein Structure," Drug Discovery World, pp. 35-48, Summer 2003.

Tawfik, Dan S. et al., "Man-Made Cell-Like Compartments For Molecular Evolution," Nature Biotechnology, vol. 16, pp. 652-656, Jul. 1998.

Thomas, B. R. et al., "Distribution Coefficients Of Protein Impurities In Ferritin And Lysozyme Cystals Self-Purification In Microgravity," Journal of Crystal Growth, vol. 211, pp. 149-156, 2000.

Thompson, L. F. et al., "Introduction To Microlithography," 185th Meeting of the American Chemical Society, Seattle, WA, pp. 2 cover pages, 1-13, Mar. 20-25, 1983.

Thorsen, Todd et al., "Dynamic Pattern Formation In A Vesicle-Generating Microfludic Device," Physical Review Letters, vol. 86, No. 18, pp. 4163-4166, Apr. 30, 2001.

Thorsen, Todd et al., "Microfluidic Large-Scale Integration," Science, vol. 298, No. 5593, pp. 580-584, Oct. 18, 2002.

Todd, Paul et al., "Application Of Osmotic Dewatering To The Controlled Crystallization Of Biological Macromolecules And Organic Compounds," Journal of Crystal Growth, vol. 110, pp. 283-292, 1991.

Tufte, O. N. et al., "Silicon Diffused-Element Piezoresistive Diaphragms," Journal of Applied Physics, vol. 33, No. 11, pp. 3322-3327, Nov. 1962.

Ulmann's Encyclopedia of Industrial Chemistry, Sections 6 to 6.3, Topic: Carbon Black, Sixth Edition, 7 pages, 1999.

Unger, Marc A. et al., "Monolithic Microfabricated Valves and Pumps by Multilayer Soft Lithography," Science, vol. 288, pp. 113-116, Apr. 7, 2000.

Van De Pol, F.C.M. et al., "A Thermo-Pneumatic Actuation Principle For A Microminiature Pump And Other Micromechanical Devices," Sensors and Actuators, vol. 17, Nos. 1-2, pp. 139-143, May 3, 1989.

Van De Pol, F.C.M. et al., "Micro Liquid Handling Devices—A Review," Micro Systems Technologies, vol. 90, pp. 799-805, 1990.

Van Den Berg, A. et al., "Micro Total Analysis Systems," Proceedings of the μTAS '94 Workshop, University of Twente, The Netherlands, 17 pages, Nov. 21-22, 1994.

Van Der Woerd, Mark et al., "Lab-On-A-Chip Based Protein Crystallization," National Aeronautics and Space Administration and Caliper, pp. 1-27, Oct. 25, 2001.

Van Der Woerd, Mark et al., "The Promise Of Macromolecular Crystallization in Microfluidic Chips," Journal of Structural Biology, vol. 142, pp. 180-187, 2003.

Velev, Orlin D., "On-Chip Manipulation Of Free Droplets," Nature, vol. 426, pp. 515-516, Dec. 4, 2003.

Verpoorte, Elisabeth M. J. et al., "Three-Dimensional Micro Flow Manifolds For Miniaturized Chemical Analysis Systems," J. Micromech. Microeng., vol. 7, pp. 246-256, 1994.

Vieider, Christian et al., "A Pneumatically Actuated Micro Valve With A Silicon Rubber Membrane For Integration With Fluid Handling Systems," Transducers '95, 8th International Conference on Solid-State Sensors and Actuators and Eurosensors IX, Stockholm, Sweden, pp. 284-286, Jun. 25-29, 1995.

Vogelstein, Bert et al., "Digital PCR," Proc. Natl. Acad. Sci. USA, vol. 96, pp. 9236-9241, Aug. 1999.

Ward, Keith B. et al., "Automatic Preparation Of Protein Crystals Using Laboratory Robotics And Automated Visual Inspection," Journal of Crystal Growth, vol. 90, pp. 325-339, 1988.

Washizu, Masao et al., "Molecular Dielectrophoresis Of Biopolymers," IEEE Transactions on Industry Applications, vol. 30, No. 4, pp. 835-843, Jul. 1994.

Weber, Patricia C. et al., "Applications Of Calorimetric Methods To Drug Discovery And The Study of Protein Interactions," Current Opinion in Structural Biology, vol. 13, pp. 115-121, 2003.

Weselak, Mark et al., "Robotics For Automated Crystal Formation And Analysis," Methods in Enzymology, pp. 1-13, 2002.

Whelen, A. Christian et al., "The Role Of Nucleic Acid Amplification And Detection In The Clinical Microbiology Laboratory," Annu. Rev. Microbiol., vol. 50, pp. 349-373, 1996.

Whitesides, George M. et al., "Flexible Methods For Microfluidics," Physics Today, pp. 42-48, Jun. 2001.

Whitesides, George M. et al., "Soft Lithography In Biology And Biochemistry," Annu. Rev. Biomed. Eng., vol. 3, pp. 335-373, 2001.

Wiencek, J. M., "New Stategies For Protein Crystal Growth," Annu. Rev. Biomed. Eng., vol. 1, pp. 505-534, 1999.

Wilbur, James L. et al., "Lithographic Molding: A Convenient Route To Structures With Sub-Micrometer Dimensions," Adv. Mater., vol. 7, No. 7, pp. 649-652, 1995.

Wu, Hongkai et al., "Fabrication Of Complex Three-Dimensional Microchannel Systems In PDMS," J. Am. Chem. Soc., vol. 125, No. 2, pp. 554-559, 2003.

Xia, Younan et al., "Complex Optical Surfaces Formed By Replica Molding Against Elastomeric Masters," Science, vol. 273, pp. 347-349, Jul. 19, 1996.

Xia, Younan et al., "Micromolding Of Polymers in Capillaries: Applications In Microfabrication," Chem. Mater., vol. 8, No. 7, pp. 1559-1566, 1996.

Xia, Younan et al., "Reduction In The Size Of Features Of Patterned SAMs Generated By Microcontact Printing With Mechanical Compression Of The Stamp," Adv. Mater., vol. 7, No. 5, pp. 471-473, 1995.

Xia, Younan et al., "Soft Lithography," Angew. Chem. Int. Ed., vol. 37, pp. 551-575, 1998.

Xu, Bing et al., "Making Negative Poisson's Ratio Microstructures By Soft Lithography," Adv. Mater., vol. 11, No. 14, pp. 1186-1189, 1999.

Yang, Xing et al., "A Low Power MEMS Silicone/Parylene Valve," Solid-State Sensor and Actuator Workshop, Hilton Head Island, South Carolina, 4 pages, Jun. 7-11, 1998.

Yang, Xing et al., "A MEMS Thermopneumatic Silicone Membrane Valve," IEEE 10th Annual International Workshop of Micro Electro Mechanical Systems, Nagoya, Japan, pp. cover, 114-118, Jan. 26-30, 1997.

Yazdi, Navid et al., "Micromachined Inertial Sensors," Proceedings of IEEE, vol. 86, No. 8, pp. 1640-1659, Aug. 1998.

Yeh, Joanne I., "A Manual Nanoscale Method For Protein Crystallization," Acta Crystallographica, vol. D59, pp. 1408-1413, 2003.

Young, A. M. et al., "Contoured Elastic-Membrane Microvalves For Microfluidic Network Integration," Journal of Biomechanical Engineering, vol. 121, pp. 2-6, Feb. 1999.

Zampighi, G. et al., "Structural Organization Of (Na ++ K+)-ATPase In Purified Membranes," Journal of Cell Biology, vol. 98, pp. 1851-1864, May 1984.

Zengerle, R. et al., "A Micro Membrane Pump With Electrostatic Actuation," Micro Electro Mechanical Systems '92, Travemünde, Germany, pp. 19-24, Feb. 4-7, 1992.

Zengerle, R. et al., "Performance Simulation Of Microminiaturized Membrane Pumps," 7th International Conference on Solid-State Sensors and Actuators, Yokohama, Japan, pp. 2 cover pages, 106-109, Jun. 7-10, 1993.

Zhao, Zhan, et al., "An Integrated Biochip Design And Fabrication," Proceedings of SPIE, vol. 4936, pp. 321-326, 2002.

Zheng, Bo et al., "A Droplet-Based, Composite PDMS/Glass Capillary Microfluidic System For Evaluating Protein Crystallization Conditions By Microbatch And Vapor-Diffusion Methods Wtih On-Chip X-Ray Diffraction," Angew. Chem., pp. 1-4, 2004.

Chen et al., "Gray-Scale Photolithography Using Microfluidic Photomasks," *PNAS*, vol. 100, No. 4, Feb. 18, 2003, pp. 1499-1504.

Supplementary European Search Report of EP application No. 04757388, Nov. 6, 2008, 2 pages.

* cited by examiner

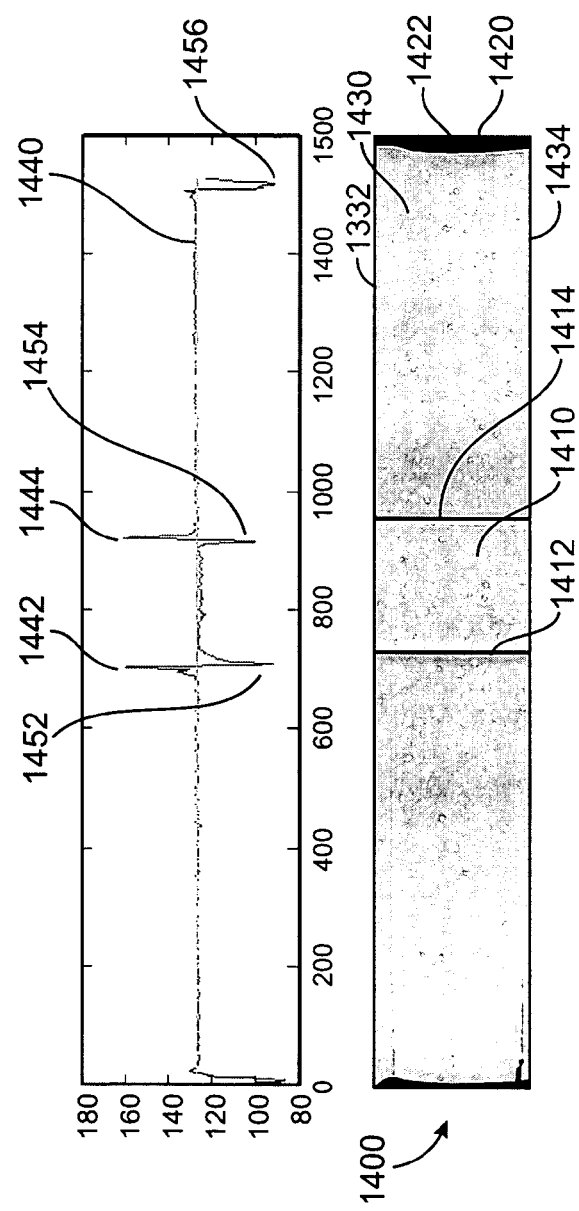
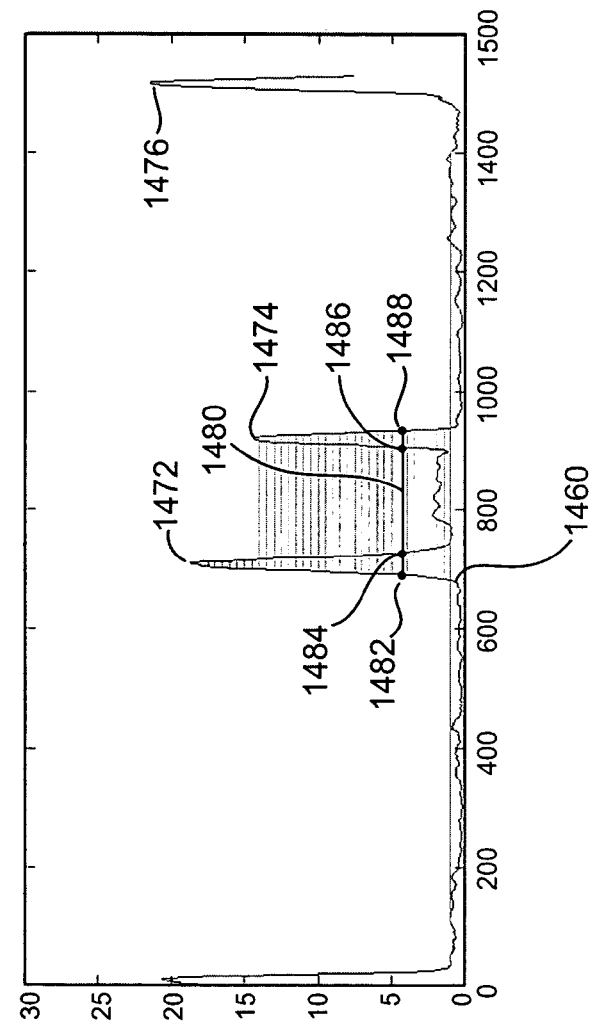
FIG. 14(a)
FIG. 14(b)
FIG. 14(c)

IMAGE PROCESSING METHOD AND SYSTEM FOR MICROFLUIDIC DEVICES

CROSS-REFERENCES TO RELATED APPLICATIONS

This application claims priority to U.S. Provisional Application No. 60/490,712, filed Jul. 28, 2003, which is incorporated by reference herein.

Additionally, U.S. application Ser. No. 10/851,777 filed May 20, 2004 and titled "Method and System for Microfluidic Device and Imaging Thereof" is incorporated by reference herein.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

COPYRIGHT NOTICE

A portion of this application contains computer codes, which are owned by Fluidigm Corporation. All rights have been preserved under the copyright protection, Fluidigm Corporation ©2004.

BACKGROUND OF THE INVENTION

The present invention is directed to image processing technology. More particularly, the invention provides an image processing method and system for detecting changes of an imaged object. Merely by way of example, the invention has been applied to crystallization in a microfluidic device. But it would be recognized that the invention has a much broader range of applicability.

Crystallization is an important technique to the biological and chemical arts. Specifically, a high-quality crystal of a target compound can be analyzed by x-ray diffraction techniques to produce an accurate three-dimensional structure of the target. This three-dimensional structure information can then be utilized to predict functionality and behavior of the target.

In theory, the crystallization process is simple. A target compound in pure form is dissolved in solvent. The chemical environment of the dissolved target material is then altered such that the target is less soluble and reverts to the solid phase in crystalline form. This change in chemical environment is typically accomplished by introducing a crystallizing agent that makes the target material less soluble, although changes in temperature and pressure can also influence solubility of the target material.

In practice however, forming a high quality crystal is generally difficult and sometimes impossible, requiring much trial and error and patience on the part of the researcher. Specifically, the highly complex structure of even simple biological compounds means that they are not amenable to forming a highly ordered crystalline structure. Therefore, a researcher must be patient and methodical, experimenting with a large number of conditions for crystallization, altering parameters such as sample concentration, solvent type, countersolvent type, temperature, and duration in order to obtain a high quality crystal, if in fact a crystal can be obtained at all.

Hansen, et al., describe in PCT publication WO 02/082047, published Oct. 17, 2002 and herein incorporated by reference in its entirety for all purposes and the specific purposes disclosed therein and herein, a high-throughput system for screening conditions for crystallization of target materials, for example, proteins. The system is provided in a microfluidic device wherein an array of metering cells is formed by a multilayer elastomeric manufacturing process. Each metering cell comprises one or more of pairs of opposing chambers, each pair being in fluid communication with the other through an interconnecting microfluidic channel, one chamber containing a protein solution, and the other, opposing chamber, containing a crystallization reagent. Along the channel, a valve is situated to keep the contents of opposing chamber from each other until the valve is opened, thus allowing free interface diffusion to occur between the opposing chambers through the interconnecting microfluidic channel. As the opposing chambers approach equilibrium with respect to crystallization reagent and protein concentrations as free interface diffusion progresses, it is hoped that the protein will, at some point, form a crystal. In preferred embodiments, the microfluidic devices taught by Hansen et al. have arrays of metering cells containing chambers for conducting protein crystallization experiments therein. Use of such arrays in turn provides for high-throughput testing of numerous conditions for protein crystallization which require analysis.

The invention disclosed herein provides systems and methods for conducting such analysis to determine whether a particular set of protein crystallization conditions indeed caused crystals to form.

BRIEF SUMMARY OF THE INVENTION

The present invention is directed to image processing technology. More particularly, the invention provides an image processing method and system for detecting changes of an imaged object. Merely by way of example, the invention has been applied to crystallization in a microfluidic device. But it would be recognized that the invention has a much broader range of applicability.

According to the present invention, a number of embodiments of the image processing method and system for microfluidic devices are provided. Merely by way of an example, a method for processing an image of a microfluidic device includes receiving a first image of a microfluidic device. The first image corresponds to a first state. Additionally, the method includes receiving a second image of the microfluidic device. The second image corresponds to a second state. Moreover, the method includes transforming the first image into a third coordinate space. The transforming uses at least a first fiducial on the first image. Also, the method includes transforming the second image into the third coordinate space. The transforming uses at least a second fiducial on the second image. Additionally, the method includes obtaining a third image based on at least information associated with the transformed first image and the transformed second image, and processing the third image to obtain information associated with the first state and the second state. In one example, the third coordinate space is based on the prior known geometry of the microfluidic device. In another example, although there are certain advantages to using the first image, the method can work adequately without the first image. The second image is transformed into the third coordinate space.

According to another embodiment of the present invention, a compluter-readable medium including instructions for processing an image of a microfluidic device comprises one or more instructions for receiving a first image of a microfluidic device. The first image corresponds to a first state. Additionally, the computer-readable medium includes one or more instructions for receiving a second image of the microfluidic device. The second image corresponds to a second state. Moreover, the computer-readable medium includes one or more instructions for transforming the first image into a third coordinate space. The transforming uses at least a first fiducial on the first image. Also the computer-readable medium includes one or more instructions for transforming the second image into the third coordinate space. The transforming uses at least a second fiducial on the second image. Additionally, the computer-readable medium includes one or more instructions for obtaining a third image based on at least information associated with the transformed first image and the transformed second image, and one or more instructions for processing the third image to obtain information associated with the first state and the second state.

Numerous benefits are achieved using the invention over conventional techniques. Depending upon the embodiment, one or more of these benefits may be achieved. For example, certain embodiments of the present invention improves the speed of imaging analysis and crystallization detection. Some embodiments of the present invention simplify the image processing system for crystallization detection. Certain embodiments of the present invention improve sensitivity of the image processing method and system.

According to yet another embodiment of the present invention, a method for processing an image of a microfluidic device includes receiving a first image of a microfluidic device. The first image includes a first fiducial marking and a first chamber region, and the first chamber region is associated with a first chamber boundary. Additionally, the method includes transforming the first image into a first coordinate space based on at least information associated with the first fiducial marking, removing at least a first part of the first chamber boundary from the first image, processing information associated with the first chamber region, and determining whether a first crystal is present in the first chamber region.

According to yet another embodiment of the present invention, a method for processing a plurality of images of a microfluidic device includes receiving at least a first image and a second image of a microfluidic device. The first image and the second image are associated with a first focal position and a second focal position respectively, and each of the first image and the second image includes a first chamber region. Additionally, the method includes processing information associated with the first image and the second image, generating a third image based on at least information associated with the first image and the second image, processing information associated with the third image, and determining whether a first crystal is present in the first chamber region based on at least information associated with the third image.

According to yet another embodiment of the present invention, a method for adjusting a classifier and processing an image of a microfluidic device includes receiving a first image of a microfluidic device. The first image is associated with at least a first predetermined characteristic. Additionally, the method includes generating a first plurality of features based on at least information associated with the first image, and selecting a second plurality of features from the first plurality of features based on at least information associated with the first plurality of features and the at least a first predetermined characteristic. Moreover, the method includes determining a third plurality of features based on at least information associated with the second plurality of features, and processing information associated with the third plurality of features. Also, the method includes determining at least a first likelihood based on at least information based on the third plurality of features and a first plurality of parameters, processing information associated with the first likelihood and the at least a first predetermined characteristic, and adjusting the first plurality of parameters based on at least information associated with the first likelihood and the at least a first predetermined characteristic.

According to another embodiment of the present invention, a computer-readable medium includes instructions for processing an image of a microfluidic device. The computer-readable medium includes one or more instructions for receiving a first image of a microfluidic device. The first image includes a first fiducial marking and a first chamber region, and the first chamber region is associated with a first chamber boundary. Additionally, the computer-readable medium includes one or more instructions for transforming the first image into a first coordinate space based on at least information associated with the first fiducial marking, and one or more instructions for removing at least a first part of the first chamber boundary from the first image. Moreover, the computer-readable medium includes one or more instructions for processing information associated with the first chamber region, and one or more instructions for determining whether a first crystal is present in the first chamber region.

According to yet another embodiment of the present invention, a computer-readable medium includes instructions for processing a plurality of images of a microfluidic device. The computer-readable medium includes one or more instructions for receiving at least a first image and a second image of a microfluidic device. The first image and the second image are associated with a first focal position and a second focal position respectively, and each of the first image and the second image includes a first chamber region. Additionally, the computer-readable medium includes one or more instructions for processing information associated with the first image and the second image, and one or more instructions for generating a third image based on at least information associated with the first image and the second image. Moreover, the computer-readable medium includes one or more instructions for processing information associated with the third image, and one or more instructions for determining whether a first crystal is present in the first chamber region based on at least information associated with the third image.

According to yet another embodiment of the present invention, a computer-readable medium includes instructions for adjusting a classifier and processing an image of a microfluidic device. The computer-readable medium includes one or more instructions for receiving a first image of a microfluidic device. The first image is associated with at least a first predetermined characteristic. Additionally, the computer-readable medium includes one or more instructions for generating a first plurality of features based on at least information associated with the first image, and one or more instructions for selecting a second plurality of features from the first plurality of features based on at least information associated with the first plurality of features and the at least a first predetermined characteristic. Moreover, the computer-readable medium includes one or more instructions for determining a third plurality of features based on at least information associated with the second plurality of features, and one or more instructions for processing information associated with the third plurality of features. Also, the computer-readable medium includes one or more instructions for determining at least a first likelihood based on at least information based on the third plurality of features and a first plurality of parameters, one or more instructions for processing information associated with the first likelihood and the at least a first predetermined characteristic, and one or more instructions for adjusting the first plurality of parameters based on at least information associated with the first likelihood and the at least a first predetermined characteristic.

Depending upon the embodiment under consideration, one or more these benefits of the present invention may be achieved. These benefits and various additional objects, features and advantages of the present invention can be fully appreciated with reference to the detailed description and accompanying drawings that follow.

BRIEF DESCRIPTION OF THE DRAWINGS

FIGS. 14(a), (b) and (c) are simplified diagrams for wall detection according to an embodiment of the present invention;

DETAILED DESCRIPTION OF THE INVENTION

The present invention is directed to image processing technology. More particularly, the invention provides an image processing method and system for detecting changes of an imaged object. Merely by way of example, the invention has been applied to crystallization in a microfluidic device. But it would be recognized that the invention has a much broader range of applicability.

Figure 1:
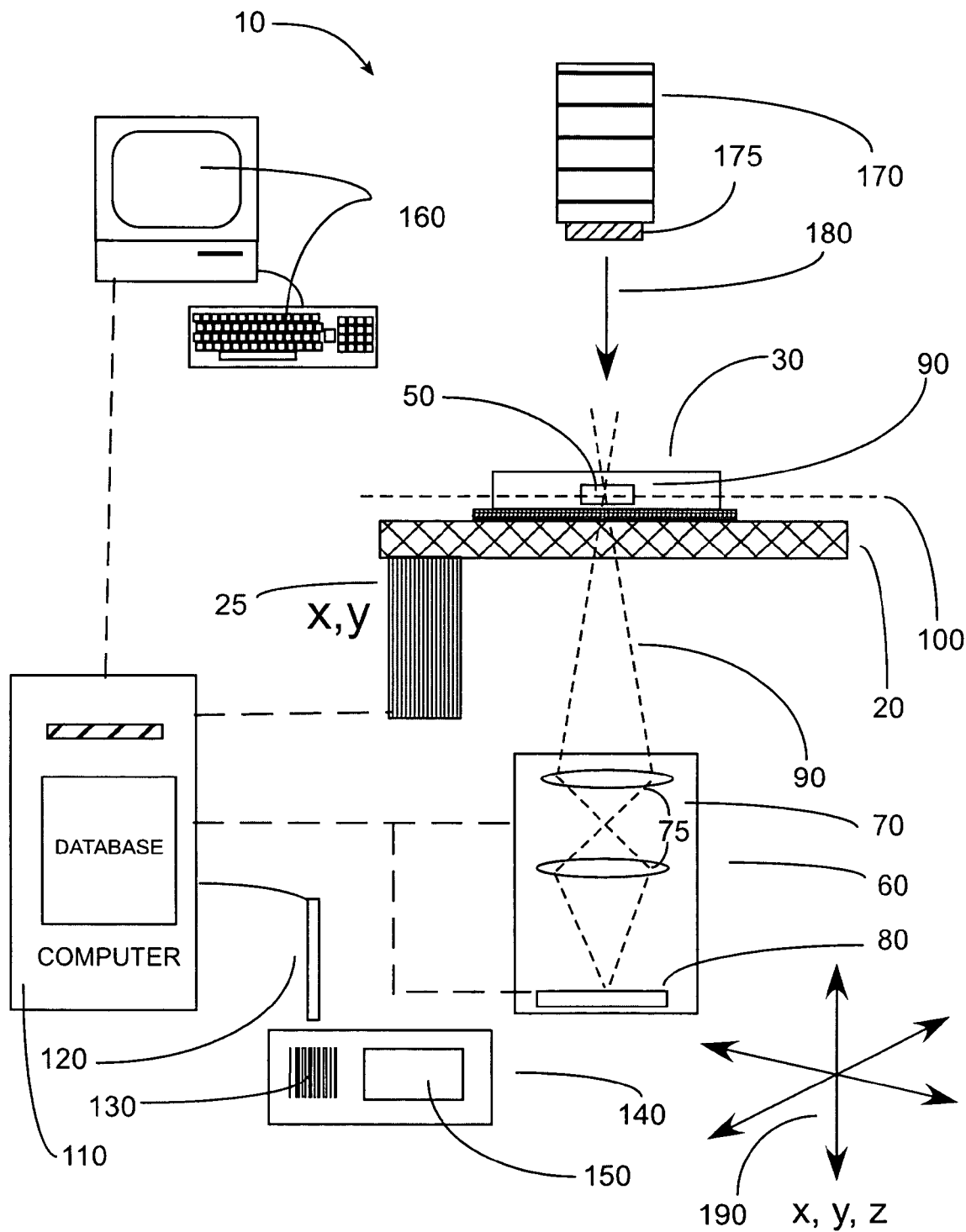
FIG. 1 depicts overview of an exemplary imaging system.
Figure 2A:
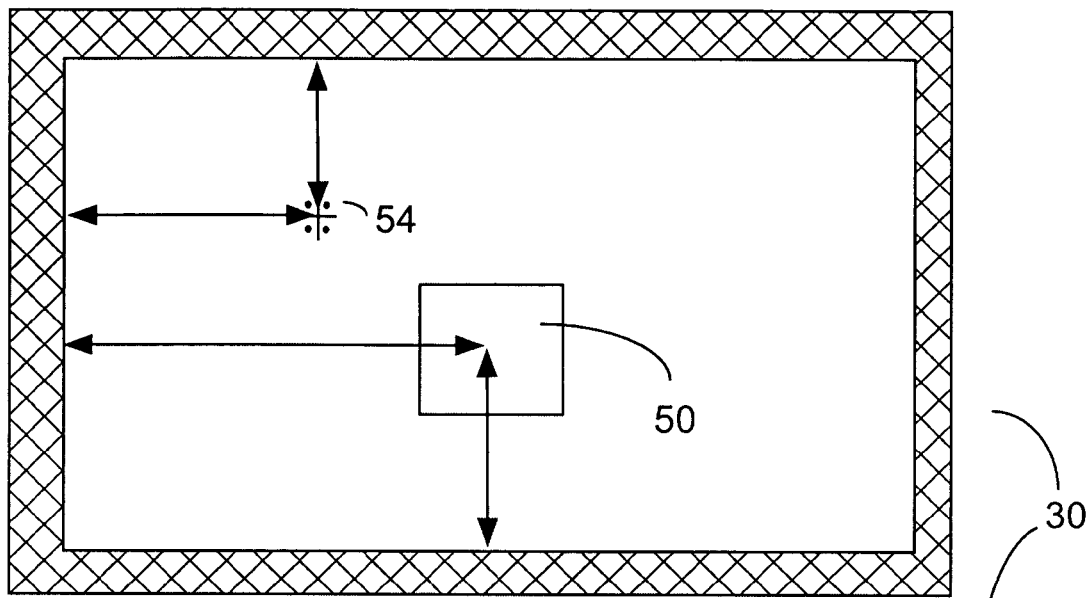
FIGS. 2a and 2b depict a top plan and cross-sectional view of an exemplary microfluidic device used in accordance with the invention.
Figure 2B:
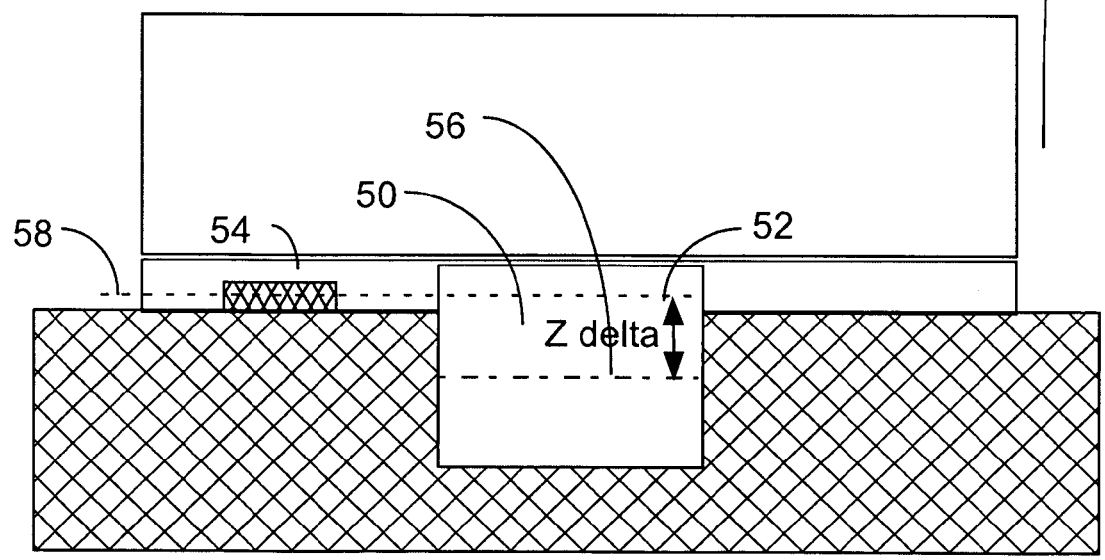

FIG. 1 is a simplified diagram for an imaging system according to an embodiment of the present invention. FIGS. 2a and 2b are simplified diagrams for a top view and cross-sectional view of a microfluidic device according to an embodiment of the present invention. The microfluidic device as shown in FIGS. 2a and 2b can be used in conjunction with the imaging system as shown in FIG. 1. These diagrams are merely examples, which should not unduly limit the scope of the claims herein. One of ordinary skill in the art would recognize many variations, alternatives, and modifications.

Imaging system (10) operates, in one embodiment, in the following manner. First, microfluidic device (30) is securely placed on stage (20). Based on a fixed feature of the microfluidic device (30), for example, an edge of the base support of microfluidic device (30), computer (110) then causes x,y drive (25) to move stage (20) about to align microfluidic device (30) in a first x,y position with a first of a plurality of fiducial marking (30), wherein the fiducial markings are embedded within microfluidic device at a known z dimension distance from a chamber center point, comes into focus by imaging device (60) based on dead reckoning from the fixed feature. A user of the system then registers the precise coordinate of the fiducial with the imaging system. Two or more additional fiducial marks are then likewise mapped with the assistance of a user. In other embodiments, this process is automatic as the centroids of the fiducials can be calculated precisely by locating the symmetric XY fiducial object and removing any non-symmetric components. Imaging device (60), under the control of computer (110) then adjusts the z dimension location of focal plane (105) to focus upon the fiducial marking (not shown in FIG. 1, but shown in FIG. 2). For example, once focused upon the first fiducial marking, the imaging system then obtains a first x,y coordinate image of microfluidic device (30) looking for additional fiducial markings within the field of view of image device (60). In preferred embodiments, the field of view can embrace an entire metering cell. The computer then analyzes the first x,y coordinate image to determine whether the microfluidic device has skew and stretch, and if skew or stretch are determined, transforms the first x,y image to align the image and coordinate map of the microfluidic device to an idealized coordinate map. The idealized coordinate map is used later during image subtraction and masking steps.

In preferred embodiments, with the microfluidic device x,y coordinate image aligned against the ideal coordinate map, the system then determines whether the stretch, distortion or lack of co-registration between the various microfluidic layers is present in the microfluidic device by comparing the location of the fiducial markings in the x,y coordinate image with the fiducial markings locations in the x,y coordinate image of the ideal stored image map. If differences are present between the actual fiducial locations and the imaged fiducial locations, a matrix transformation, preferable an Affine transformation, is performed to transform the imaged shape of the metering cell into a virtual shape of the ideal metering cell shape. By converting the actual image to a known and fixed ideal image using the matrix transformation computed from the differences between the measured actual fiducial locations and the stored ideal fiducial locations, image subtraction and other image analysis are made possible. For instance, FIG. 3 depicts an ideal microfluidic device stored image (actually stored as a coordinate map), and an actual, distorted, microfluidic device image (also stored as a coordinate map determined from fiducial mapping). By computing the differences between the coordinate maps through matrix analysis, a matrix transformation may be developed to reform the actual image into an ideal image for use in further image processing described herein. By causing the imaged microfluidic device to conform to a standard shape, image subtraction and masking is possible to maximize the viewable area of a metering cell chamber. Moreover, if defects or debris are present within the chamber at time zero in a series of time based images, such defects or debris can be masked out of subsequent images to avoid false positive when applying automated crystal recognition analysis. In addition to masking off areas of the chambers which contain defects or debris, the walls of the chambers may be subtracted from subsequent images, again so as to not cause false reading with the crystal recognition analysis. The discrepancy between various layers, such as between the control layer and the channel layer, can also be calculated based on the position of a found object in the control layer, such as the control lines themselves. In another example, this correction is determined based on the control layer fiducials themselves. For certain embodiments, this extra transformation is important since the control layer partitions the protein chamber from the rest of the control line.

Figure 4A:
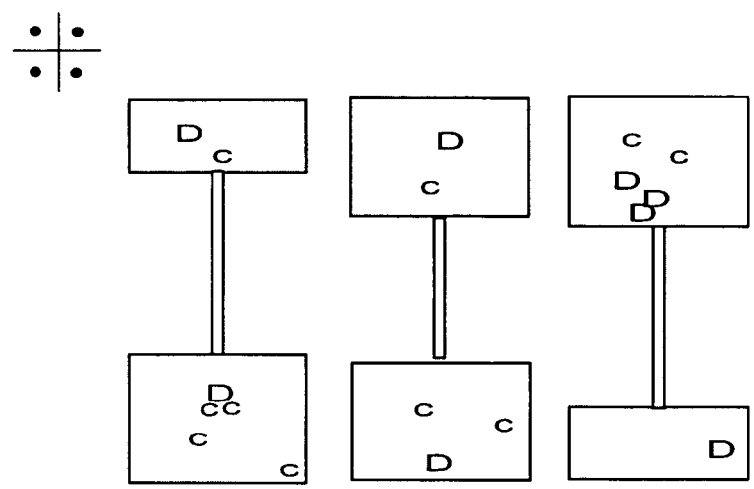
FIGS. 4a through 4c depict the process of masking and image subtraction employed in accordance with the invention.
Figure 4B:
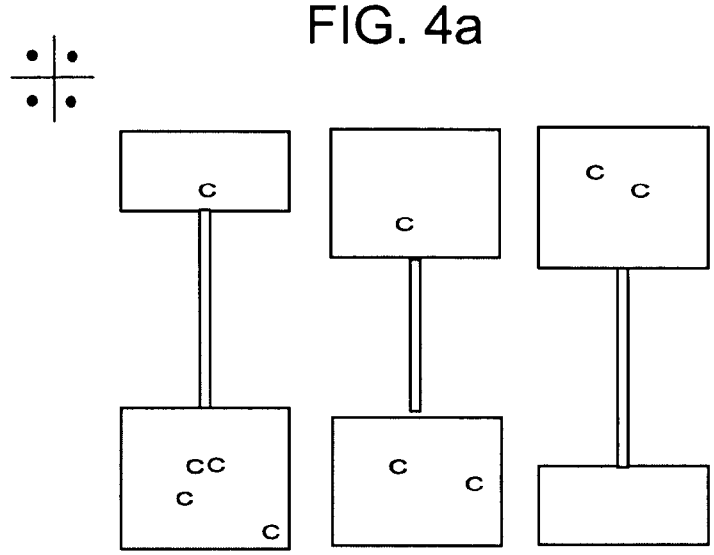
Figure 4C:
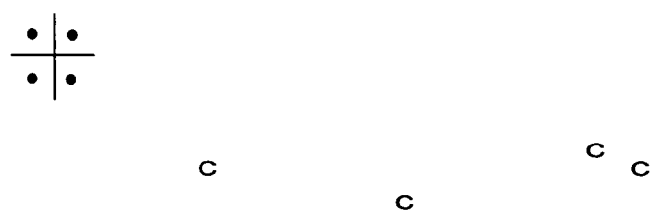

FIGS. 4a through 4c depict how the above image subtraction and masking occur at time zero prior to crystal formation. FIG. 4a depicts a metering cell with debris, shown as the letter "D" distributed about the metering cell chambers. Using the technique described above, after the metering cell has been rotated, if needed, to align with the ideal metering coordinate system, and after the metering cell has been stretch compensated to make the imaged metering cell dimensions match those of the ideal metering cell dimensions, then foreign objects not present in the ideal image are masked out, meaning that those regions including, and immediately surrounding the foreign objects are masked so as to avoid falsely triggering the crystal detection analysis into deeming the foreign object as a crystal that was formed. FIG. 4b depicts an image wherein the mask has removed the foreign objects from the image so as to not provide false triggers for image analysis. FIG. 4c depicts how image subtraction is applied to remove the chamber edge features from the image to reduce the raw image into one of just wall-less chambers. From this final image, further masking may occur if wall implosion is detected, an event that usually occurs when the microfluidic device is dehydrating and the chamber contents are permeating outside of the chamber, causing a negative pressure therein and thus, wall collapse or implosion. Such further masking for implosion employs a series of known shapes that occur when chamber implosion occurs and uses such known shapes to create additional masks to occlude from the image the now intruding imploded walls.

Figure 5:
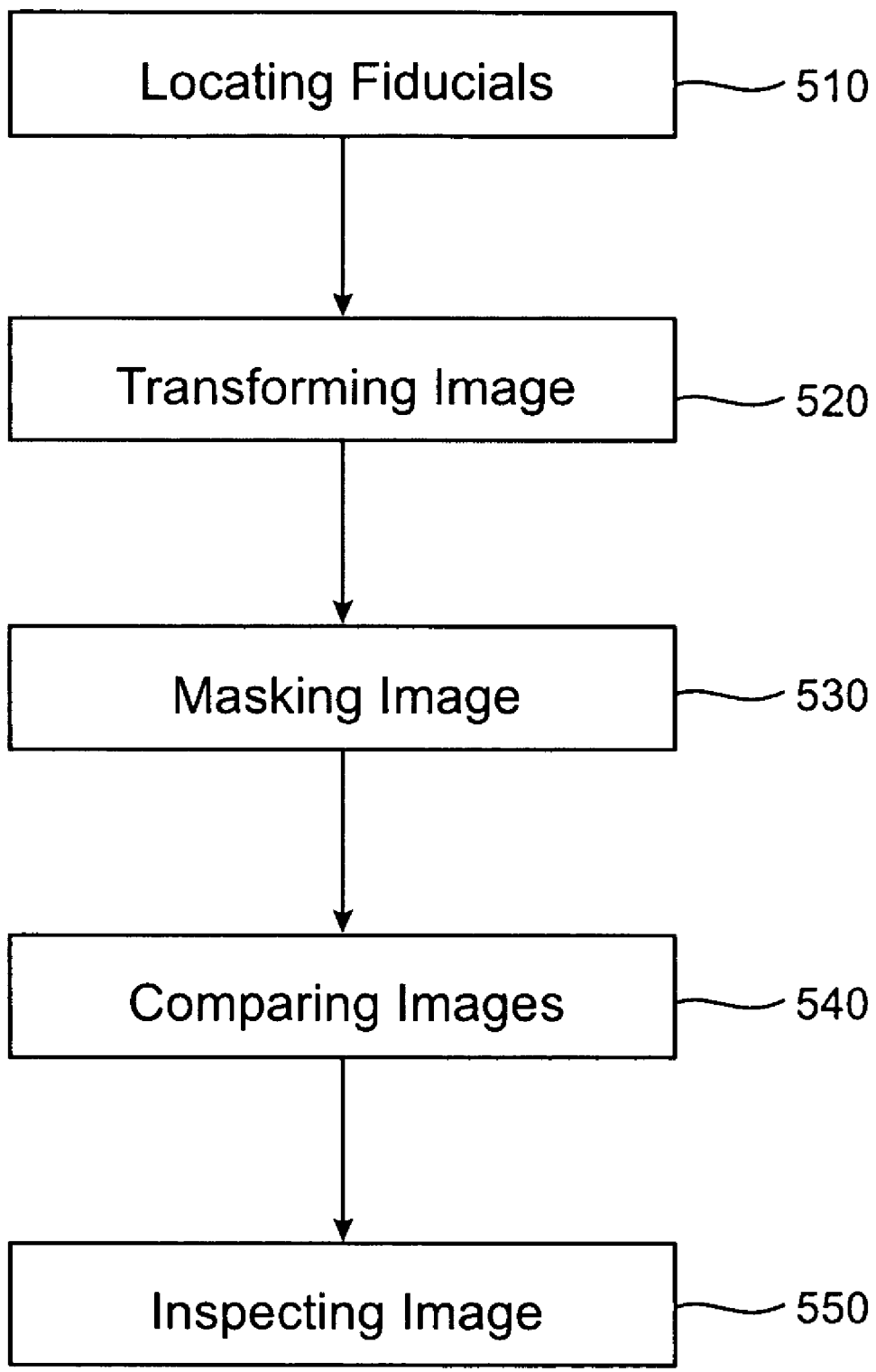
FIG. 5 is a simplified diagram for an image processing method according to an embodiment of the present invention.

FIG. 5 is a simplified diagram for an image processing method according to an embodiment of the present invention. This diagram is merely an example, which should not unduly limit the scope of the claims herein. One of ordinary skill in the art would recognize many variations, alternatives, and modifications. The method includes a process 510 for locating fiducials, a process 520 for transforming image, a process 530 for masking image, a process 540 for comparing images, and a process 550 for inspecting image. Although the above has been shown using a selected sequence of processes, there can be many alternatives, modifications, and variations. For example, some of the processes may be expanded and/or combined. Other processes may be inserted to those noted above. Depending upon the embodiment, the specific sequence of processes may be interchanged with others replaced. The process 540 for comparing images may be performed prior to the process 530 for masking image, during the process 530 for masking image, and/or after the process 530 for masking image. Future detail of the present invention can be found throughout the present specification and more particularly below.

At the process 510, marking fiducials are located on an image. The image may be renormalized against a reference image, which was previously taken with either a standardized slab or nothing under the microscope, for white balancing or for exposure normalization, or other desirable characteristics. Marking fiducials may include cross hairs. In one embodiment of the present invention, the image includes metering cells in addition to a Fluidigm logo. Each metering cell has cross-hair fiducials at known locations around the metering cell. During the image acquisition, the positions of these fiducials are determined to within ±100 microns through the X-Y correction process. This estimation accuracy may be achieved even under rotational orientations. During the process 510, some sub-images are extracted around these estimated locations. Within these sub-images, the cross-hair fiducials are found, and their global positions are determined. The global positions in the T0 image are compared to the global positions in a subsequent image, such as the T1 image, the T2 image, . . . , the TM image, . . . , or the TN image. N is a positive integer, and M is a positive integer smaller than or equal to N. The T0 image is captured at T0; while the TM image is captured at TM. For example, at T0, no crystallization of protein occurs. At TM, crystallization of protein may have occurred. If a single fiducial is missed from the T0 image or the subsequent TM image, the missed fiducial is usually not considered during the subsequent analysis of the images.

Figure 6:
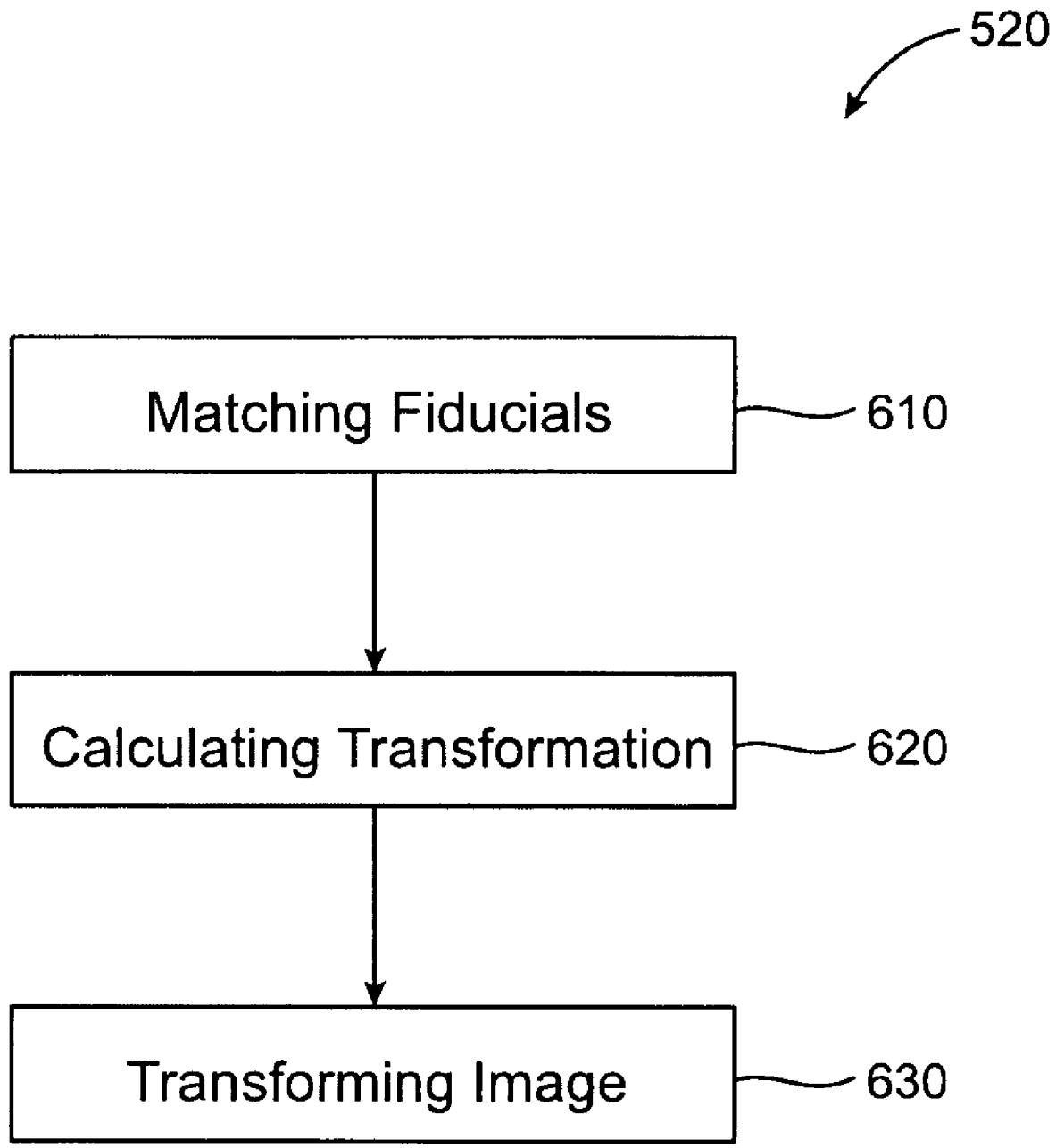
FIG. 6 is a simplified process 520 for transforming images according to one embodiment of the present invention.

FIG. 6 is a simplified process 520 for transforming images according to one embodiment of the present invention. This diagram is merely an example, which should not unduly limit the scope of the claims herein. One of ordinary skill in the art would recognize many variations, alternatives, and modifications. The process 520 includes a process 610 for matching fiducials, a process 620 for calculating transformation, and a process 630 for transforming image. Although the above has been shown using a selected sequence of processes, there can be many alternatives, modifications, and variations. For example, some of the processes may be expanded and/or combined. The process 620 for calculating transformation and the process 630 for transforming image may be combined. Other processes may be inserted to those noted above. Depending upon the embodiment, the specific sequence of processes may be interchanged with others replaced. Future detail of the present invention can be found throughout the present specification and more particularly below.

At the process 610, fiducials in an image is matched with corresponding fiducials in an ideal coordinate map. For example, the image is the T0 image or the TM image. In one embodiment, the image is an x-y coordinate image, and the ideal coordinate map is an x-y coordinate map. The image is aligned against the ideal coordinate map. Locations of the fiducials in the image are compared with locations of the fiducials in the ideal coordinate map. Such comparison can reveal any distortion including a stretch of the microfluidic device when the image is captured, such as at T0 or TM.

At the process 620, a spatial transformation from an image to an ideal coordinate space is calculated. The ideal coordinate space corresponds to the ideal coordinate map. In one embodiment, a matrix transformation, such as an Affine transformation, is calculated. For example, two least squares transformations are calculated from the T0 image to an ideal coordinate space and from the TM image to the ideal coordinate space.

Figure 3A:
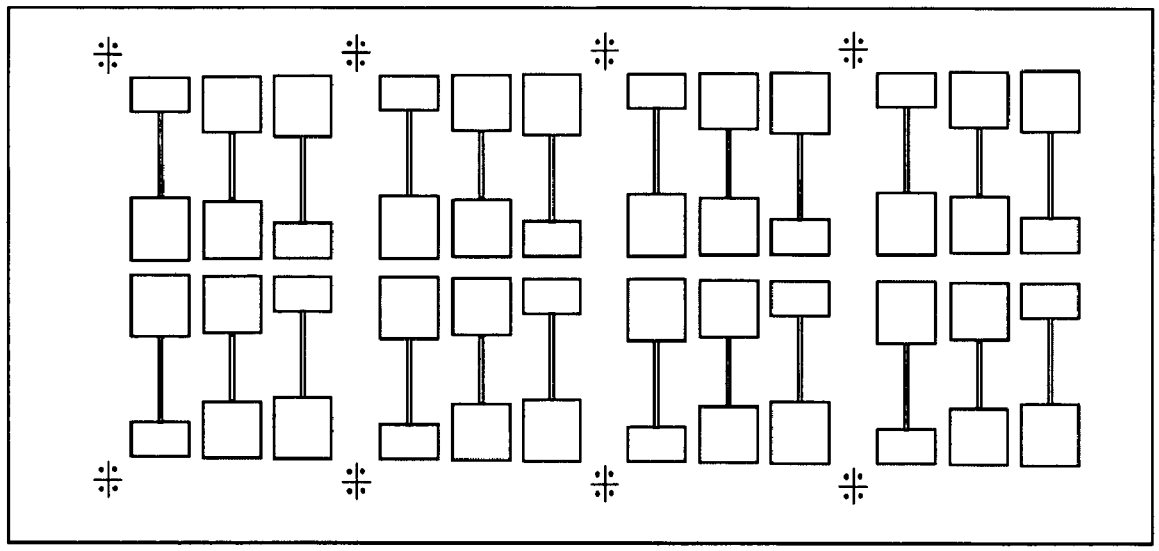
FIGS. 3a and 3b depict how metering cell stretch and distortion may be compensated in accordance with the invention.
Figure 3B:
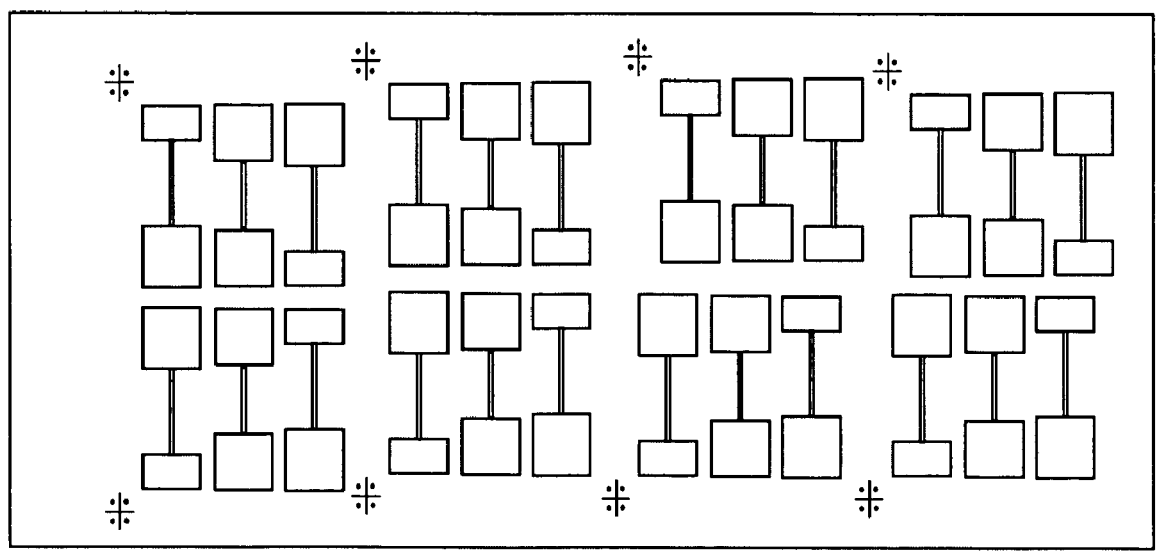

At the process 630, an image is transformed into an ideal coordinate space. The image may be the T0 image or the TM image. For example, a matrix transformation, such as an Affine transformation, changes the shape of a metering cell in the image into an ideal shape. The metering cell may be sliced into three or more diffusion experiments. In one embodiment, FIG. 3a shows a simplified ideal coordinate map, and FIG. 3b shows a simplified distorted image. By computing the differences between the fiducial locations in the coordinate map and the corresponding fiducial locations in the distorted image, a matrix transformation may be performed to convert the distorted image into an ideal image.

At the process 630, the T0 image and the TM image are transformed into the ideal coordinate space. The transformed T0 image and the transformed TM image are located in the same coordinate space, so they are co-registered and comparable to one another. The transformed T0 image can be subtracted from the TM image to detect crystallization in the TM image. But such subtraction does not remove all the noise sources that should be removed.

In theory, the locations of the wells in the ideal coordinate space is known since the cross-hair fiducials are on the same layer as the wells, but in practice each metering cell is unique. Dead-reckoning the well-locations including well-walls usually do not provide accurate information. Instead, a sub-rectangular is usually extracted around each well location, and the T0 image is used to look for the well walls. For example, four linear lines are fitted to the four walls of the well. In addition, four vertical lines are usually used to determine four of the six walls for the three channel segments.

Figure 7:
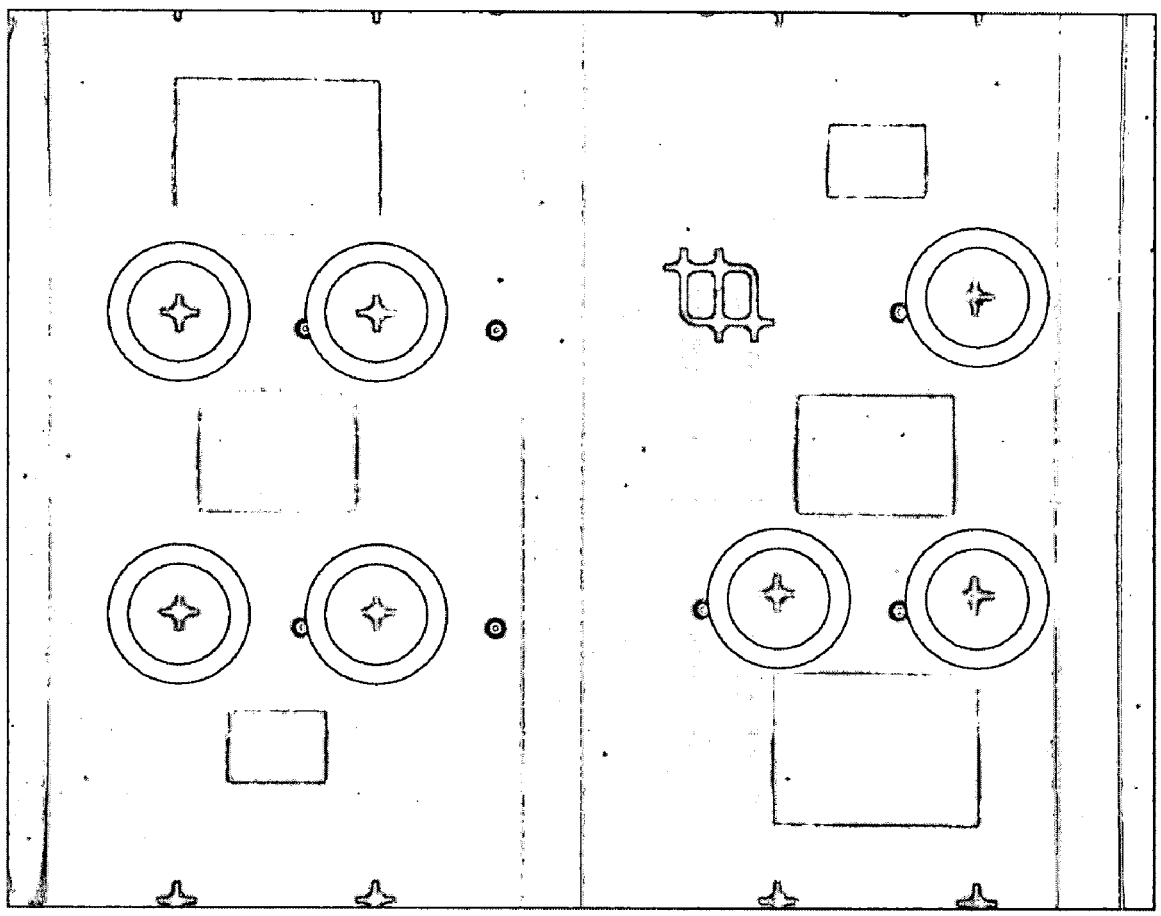
FIG. 7 shows simplified wells and channels according to one embodiment of the present invention.

FIG. 7 shows simplified wells and channels according to one embodiment of the present invention. This diagram is merely an example, which should not unduly limit the scope of the claims herein. One of ordinary skill in the art would recognize many variations, alternatives, and modifications. The four vertical lines as discussed above include the left-wall of the right channel, the right wall and the left wall of the middle channel, and the right wall of the left channel. The remaining two walls, e.g., the right wall of the right channel and the left wall of the left channel are demarcated by the containment lines which are found through thresholding a 1-D horizontal signal of a gross left and right sub-image. The analysis of one-dimensional horizontal signal can also locate an interface line in the center channel and the top and bottom walls of the horizontal channels using small windows across the x-dimension. The horizontal channels can be tilted out of the horizontal due to alignment errors. The interface lines and the top and bottom walls of the channels are used in the subsequently processes.

Figure 8:
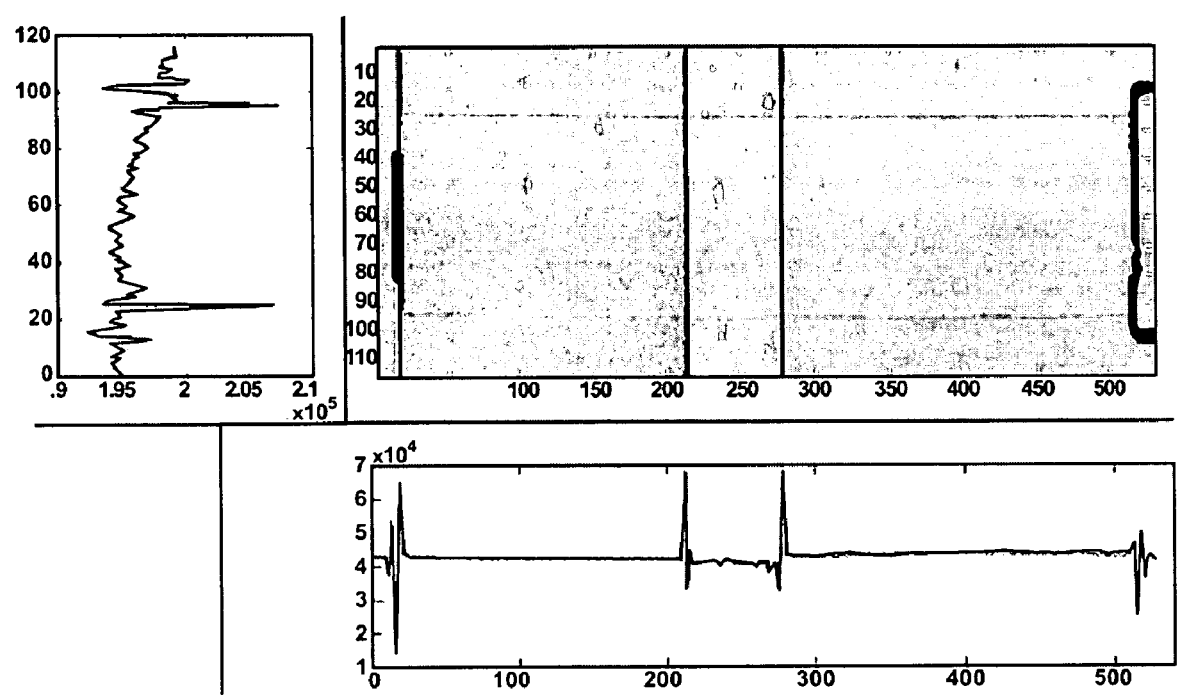
FIGS. 8-10 are simplified diagrams showing sample 1-D signals.
Figure 9:
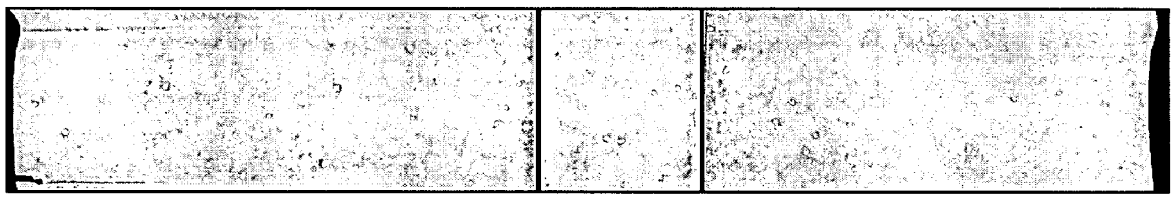
Figure 10:
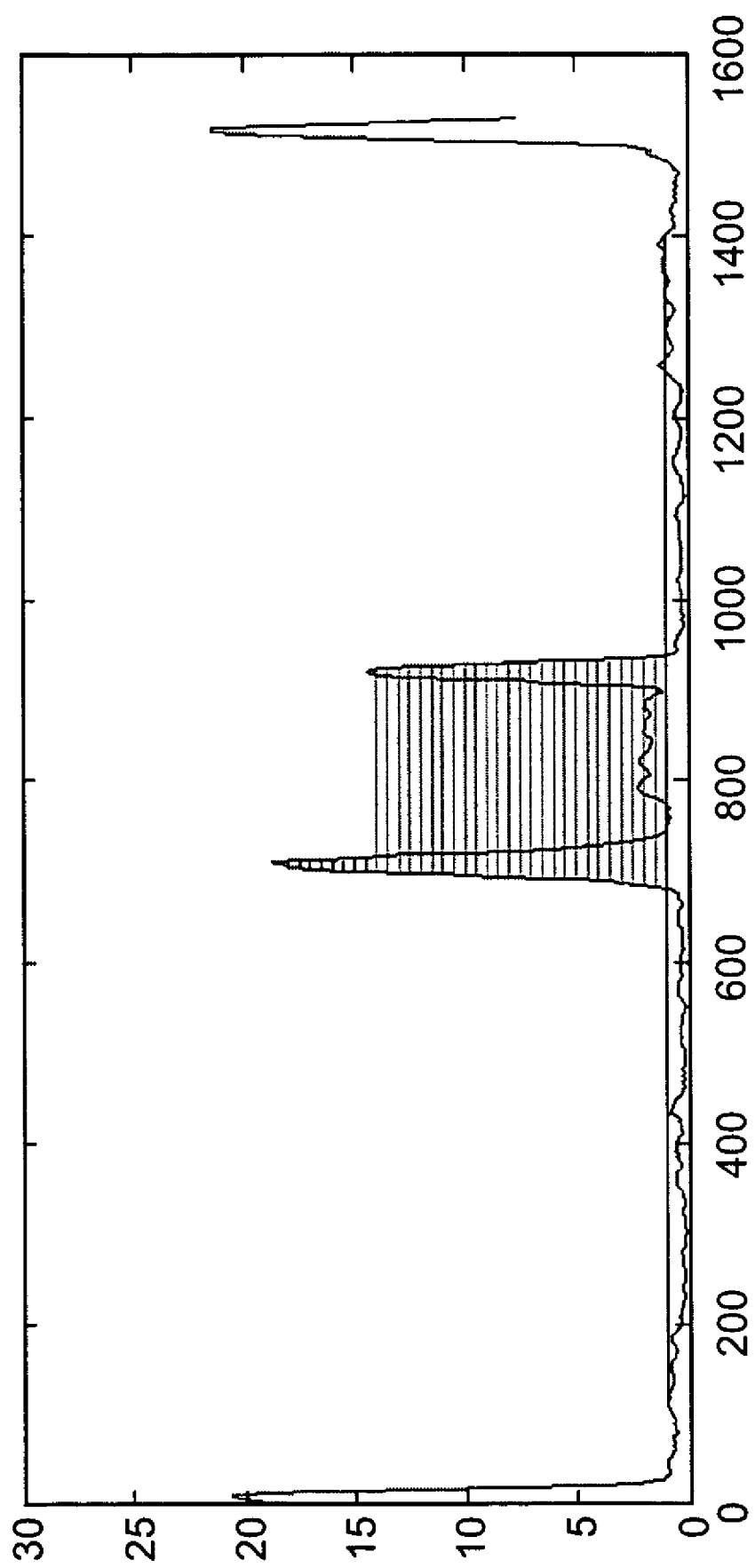

FIGS. 8-10 are simplified diagrams showing sample 1-D signals. These diagrams are merely examples, which should not unduly limit the scope of the claims herein. One of ordinary skill in the art would recognize many variations, alternatives, and modifications. In certain embodiments, the channel walls are not as crisp in signal as shown in FIGS. 8-10, as the strength of that signal depends on the z-location at the time of image acquisition. Specifically, FIG. 9 is a simplified diagram for interface line detection. FIG. 10 is a simplified diagram for filtered and width matched signal. In some embodiments, the fiducials are on the same layer as the channel. The channel position can be found via the affine transformation without finding the channel walls.

At the process 530, an image is masked. The masking increases the viewable area of a metering cell chamber. If defects or debris are present within a chamber in the T0 image, these defects or debris can be masked out of the T0 image and the subsequent TM image. The removal of defects or debris can reduce the number of false positives in automated crystal recognition analysis.

Figure 11:
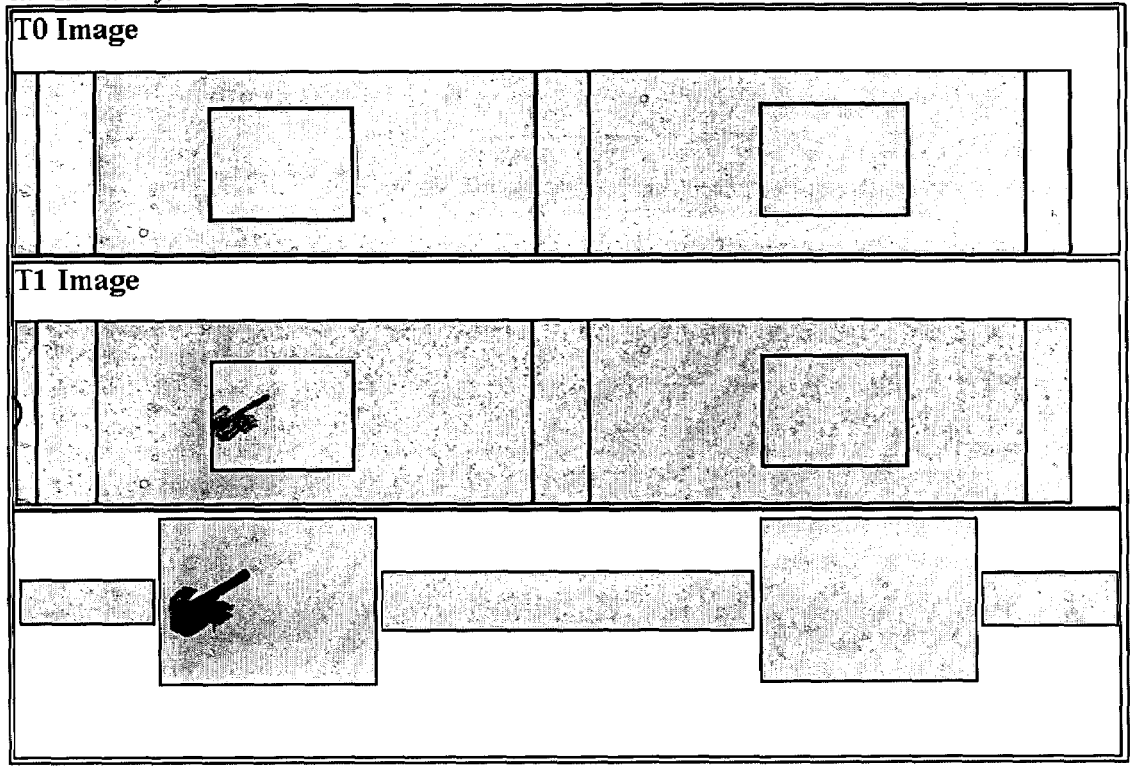
FIG. 11 is a simplified diagram for masking images according to one embodiment of the present invention.

For example, a stamp or a mask is calculated from the T0 image in order to mask out regions of the T0 image that contain signals not of interest to the crystal recognition analysis. FIG. 11 is a simplified diagram for masking images according to one embodiment of the present invention. The T0 image and the T1 image are captured and transformed to the ideal coordinate space. Each rectilinear region contains four bounding walls. The region beyond the four bounding walls in the T0 image is masked out of the subsequent analysis. Similarly, the interface line is masked out. Additionally, large blob objects that appear in the region of interest and exceed threshold in the T0 image are similarly masked as they are assumed to be pre-existing before crystallization. As shown in FIG. 11, a blob object appears in the right channel in both the T0 image and the T1 image, but the blob object does not exist in the scrubbed lower-right image.

The cells, voids, and spaces are deformable in microfluidic devices, so they can change in size from T0 to TM. Such deformation of the cell surfaces is modeled, and the mask is accordingly modified for the corresponding TM. For example, as shown in FIG. 11, the left and right well subcomponents have their "implosion-padding" values calculated. This is necessary because the substantial pressure difference in the well between T0 and TM implodes the walls from their original position.

Figure 12:
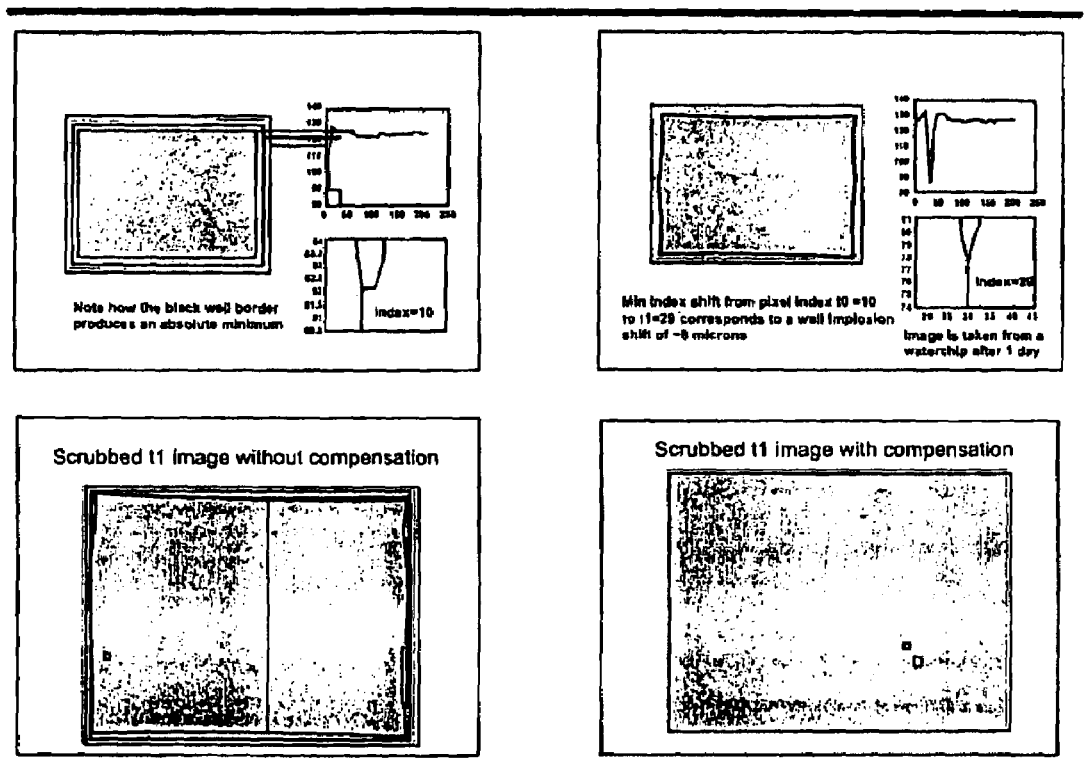
FIG. 12 is a simplified diagram for implosion-padding process.

According to one embodiment of the present invention, the implosion-padding process includes extracting rectangle around a well in the T0 image, calculating an average of a succession of rectangle-perimeters from the T0 image, finding a minimum value of this vector and the index, repeating the above three processes of extracting, calculating, and finding for the subsequently T1 image, the T2 image, ..., the TM image, ..., and the TN image, and calculating the difference in the indices. The difference in the indices is used to estimate additional padding to the masking region for the original T0 image. FIG. 12 is a simplified diagram for implosion-padding process. As discussed above and further emphasized here, this diagram is merely an examples, which should not unduly limit the scope of the claims herein. One of ordinary skill in the art would recognize many variations, alternatives, and modifications.

At the process 540, images are compared to generate a comparison image. For example, a comparison image results from the subtraction of the T0 image from the TM image. The scrubbing can usually remove the walls of the chambers. Such removal can reduce false reading in the crystal recognition analysis. As discussed above and further emphasized here, the process 540 for image comparison may be performed prior to the process 530 for masking image, during the process 530 for masking image, and/or after the process 530 for masking image.

In one embodiment, the comparison image is median re-centered to push the middle to 128 instead of the arbitrary value that would otherwise result. The intensity of the image can vary even with respect to the reference image as it is dependent on the hydration conditions on the chip. The mask generated in the process 530 is applied to the comparison image to create an attenuating front which softens the harsh borders that the mask would introduce to an image. The closer an image pixel is to a mask pixel, the more the image pixel is attenuated. This process is one example of scrubbing. The distance map describing the distance of each image pixel from a mask pixel is calculated separately from the T0 image.

FIGS. 4a through 4c are simplified diagrams for image subtraction, masking and scrubbing. These diagrams are merely examples, which should not unduly limit the scope of the claims herein. One of ordinary skill in the art would recognize many variations, alternatives, and modifications. As shown in FIG. 4a, a metering cell contains debris indicated by the letter D's distributed about the metering cell chambers. With the processes described above, the metering cell may be rotated to align with the ideal coordinate map, and is transformed to make the imaged metering cell dimensions match those of the ideal metering cell dimensions. For example, the transformation can stretch compensate the image. Subsequently, the foreign objects not present in the ideal image are masked out. The masking process removes signals from the regions including and immediately surrounding the foreign objects. The removal can reduce falsely identifications of the foreign objects as crystals. FIG. 4b is a simplified diagram for an image with foreign objects removed. FIG. 4c is a simplified diagram for image subtraction. The image subtraction calculates differences between the T0 image and the TM image, and thereby removes the chamber edge features from the TM image. The TM image is converted into an image having wall-less chambers.

For this converted image, a further masking may be needed if wall implosion is detected. Wall implosion usually occurs when the microfluidic device is dehydrating and the chamber contents are permeating outside of the chamber. The permeation causes a negative pressure therein and thus wall collapse or implosion. Such further masking for implosion employs a series of known shapes that occur when chamber implosion occurs and uses such known shapes to create additional masks to occlude from the image the now intruding imploded walls.

According to one embodiment of the present invention, an output scrubbed image is calculated by first renormalizing the T0 image and the TM image with respect to each other. The renormalization process can reduce a DC or background signal resulting from environmental changes to the chip, such as loss of chip moisture. A simple subtraction image is then calculated with a 128 offset. This subtraction image is then "scrubbed" by stamping all the pixel locations in the stamp with 128 and thereby obliterating their output signal. Additionally, pixel locations are progressively attenuated based on their x-y distance to a stamped pixel in the mask. Therefore the subtraction image is scrubbed around the mask pixels to ensure a smooth transition from the stamped 128 value and the real image values.

At a process 550, an image is inspected for crystals. For example, the final scrubbed image is sent through a feature extractor which performs additional image processing techniques on the image.

Training and selection of these features is a semi-automatic process using Matlab scripts. A random combination of these features is selected. The higher dimensional space is mapped to a lower dimensionality through fisher-linear discriminant analysis to increase the separability of crystals from other materials. Classification is performed in this lower dimensional space using a K-nearest neighbor algorithm. A confusion matrix for the original training set is calculated by excluding the instance under test and a cost matrix is applied to the training matrix to evaluate the "goodness" of the training run. The best training run is used to determine the number of neighbors, the features used and two thresholds used for false positive rejection and false negative rejection.

According to yet another embodiment of the present invention, a computer medium includes instructions for processing an image of a microfluidic device. The computer medium stores a computer code that directs a processor to perform the inventive processes as discussed above. An exemplary computer code may use Matlab or other computer language, and may run on Pentium PC or other computer. The computer code is not intended to limit the scope of the claims herein. One of ordinary skill in the art would recognize other variations, modifications, and alternatives.

For example, the computer-readable medium includes one or more instructions for receiving the T0 image of a microfluidic device. The T0 image is captured prior to crystallization. Additionally, the computer-readable medium includes one or more instructions for receiving the TM image of the microfluidic device. The TM image is captured after the T0 image. Moreover the computer readable medium includes one or more instructions for transforming the T0 image into an ideal coordinate space using at least a fiducial on the T0 image, one or more instructions for transforming the TM image into the ideal coordinate space using at least a fiducial on the TM image, one or more instructions for obtaining a comparison image based on at least information associated with the transformed T0 image and the transformed TM image, and one or more instructions for processing the comparison image to obtain information associated with the crystallization.

As another example, the computer code can perform locating fiducials, transforming image, masking image, comparing images, and inspecting image. As yet another example, the computer code performs some or all of the processes as described in FIGS. 1-12.

As discussed above and further emphasized here, the above examples of computer-readable medium and computer code are merely examples, which should not unduly limit the scope of the claims herein. One of ordinary skill in the art would recognize many variations, alternatives, and modifications. For example, some processes may be achieved with hardware while other processes may be achieved with software. Some processes may be achieved with a combination of hardware and software. Although the above has been shown using a selected sequence of processes, there can be many alternatives, modifications, and variations. For example, some of the processes may be expanded and/or combined. Depending upon the embodiment, the specific sequence of processes may be interchanged with others replaced.

Numerous benefits are achieved using the invention over conventional techniques. Depending upon the embodiment, one or more of these benefits may be achieved. For example, certain embodiments of the present invention improves the speed of imaging analysis and crystallization detection. Some embodiments of the present invention simplify the image processing system for crystallization detection. Certain embodiments of the present invention improve sensitivity of the image processing method and system.

As discussed above and further emphasized here, FIGS. 1-12 represent certain embodiments of the present invention, and these embodiments include many examples. In one example, at the process 510, marking fiducials are located on an image. The image may be renormalized against a reference image, which was previously taken with either a standardized slab or nothing under the microscope, for white balancing or for exposure normalization, or other desirable characteristics. The image may be 8-bit renormalized with high resolution, or other desirable characteristics. Marking fiducials may include cross hairs. In one embodiment of the present invention, the image includes metering cells in addition to a Fluidigm logo. Each metering cell has cross-hair fiducials at known locations around the metering cell. During the image acquisition, the positions of these fiducials are determined to within ±100 microns through the X-Y correction process. This estimation accuracy may be achieved even under rotational orientations. During the process 510, some sub-images are extracted around these estimated locations. Within these sub-images, the cross-hair fiducials are found, and their global positions are determined. In one example, the T0 image is analyzed at the process 510, and in another example, the T0 image is not analyzed at the process 520. For example, the T0 image is captured at T0. At T0, no crystallization of protein occurs. At TM, crystallization of protein may have occurred.

If the T0 image is analyzed at the process 520, the global positions in the T0 image are compared to the global positions in a subsequent image, such as the T1 image, the T2 image, ..., the TM image, ..., or the TN image. N is a positive integer, and M is a positive integer smaller than or equal to N. The TM image is captured at TM. If a single fiducial is missed from the T0 image or the subsequent TM image, the missed fiducial is usually not considered during the subsequent analysis of the images.

In another example, the process 520 includes a process 610 for matching fiducials, a process 620 for calculating transformation, and a process 630 for transforming image. At the process 610, fiducials in an image is matched with corresponding fiducials in an ideal coordinate map. For example, the image is the TM image. In one embodiment, the image is an x-y coordinate image, and the ideal coordinate map is an x-y coordinate map. The image is aligned against the ideal coordinate map. Locations of the fiducials in the image are compared with locations of the fiducials in the ideal coordinate map. Such comparison can reveal any distortion including a stretch of the microfluidic device when the image is captured, such as at TM. In one embodiment, the ideal coordinate map takes into account certain characteristics of the imaging system 10 and/or the microfluidic device 30. For example, the characteristics include some imperfections known or predicted at the time the ideal coordinate map was generated.

At the process 620, a spatial transformation from an image to an ideal coordinate space is calculated. The ideal coordinate space corresponds to the ideal coordinate map. In one example, a least squares transformation is calculated from the T0 image to the ideal coordinate space. In another example, a least squares transformation is not calculated from the T0 image to the ideal coordinate space.

At the process 630, an image is transformed into an ideal coordinate space. For example, the T0 image is transformed. In another example, the T0 image is not transformed. In one embodiment, the transformed images are located in the same coordinate space, so they are co-registered and comparable to one another. In another embodiment, the transformed image includes at least part of the microfluidic device 30. For example, the microfluidic device 30 has the channel regions and well regions. In certain embodiments, the channel regions and the well regions are interchangeable. The channels and the wells refer to recessed regions in the microfluidic device. In other embodiments, the microfluidic device uses channel regions to function as well regions. In yet other embodiments, the microfluidic device includes chambers that can be used as fluid channels, control channels, and wells.

At the process 530, an image is masked. For example, a stamp or a mask is calculated using predetermined information about the idealized image. As shown in FIG. 11, the TM image is captured and transformed to the ideal coordinate space. Each rectilinear region contains four bounding walls. The region beyond the four bounding walls in the TM image is masked out of the subsequent analysis. Similarly, the interface line is masked out.

Figure 13:
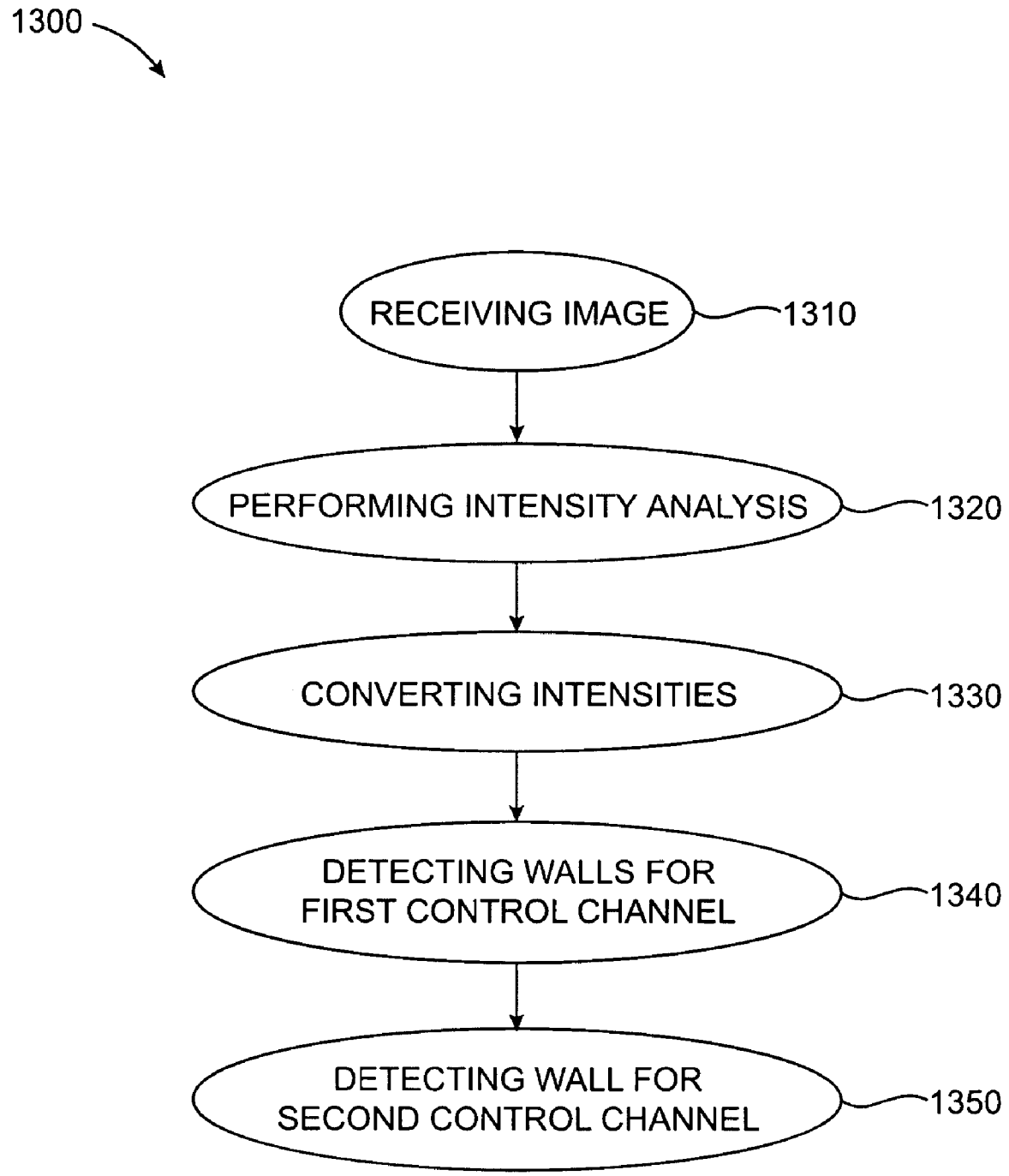
FIG. 13 is a simplified method for wall detection according to an embodiment of the present invention.

In another example, FIG. 13 is a simplified method for wall detection. This diagram is merely an example, which should not unduly limit the scope of the claims. One of ordinary skill in the art would recognize many variations, alternatives, and modifications. The method 1300 includes process 1310 for receiving image, process 1320 for performing intensity analysis, process 1330 for converting intensities, process 1340 for detecting walls for first control channel, and process 1350 for detecting wall for second control channel. Although the above has been shown using a selected sequence of processes, there can be many alternatives, modifications, and variations. For example, the processes 1310 and 1320 is combined. In another example, the processes 1340 and 1350 is combined. Other processes may be inserted to those noted above. Depending upon the embodiment, the specific sequences of processes may be interchanged with others replaced. Further details of these processes are found throughout the present specification and more particularly below.

FIGS. 14(*a*), (*b*) and (*c*) are simplified diagrams for wall detection according to an embodiment of the present invention. These diagrams are only illustrative, which should not unduly limit the scope of the claims herein. One of ordinary skill in the art would recognize many variations, alternatives, and modifications.

At the process 1310, an image is received. For example, the image is the T0 image or the TM image. In one embodiment, as shown in FIG. 14(*a*), an image 1400 includes an interface line 1410 as a first control channel, a containment line 1420 as a second control channel, and a reaction channel 1430. The interface line 1410 includes walls 1412 and 1414, and the containment line 1420 includes a wall 1422. The reaction channel includes walls 1432 and 1434. For example, the interface line 1410 and the containment line 1420 are in the control layer. In another example, the reaction channel 1430 is used for protein crystallization.

At the process 1320, an intensity analysis is performed. In one embodiment, as shown in FIG. 14(*b*), the image 1400 is analyzed based on intensity. A curve 1440 represents image intensity along the direction of the reaction channel 1430. The curve 1440 includes at least five peaks 1442, 1444, 1452, 1454, and 1456. The peaks 1442 and 1444 correspond to bright regions, and the peaks 1452, 1454, and 1456 correspond to dark regions. The peaks 1442 and 1452 are associated with to the wall 1412, the peaks 1444 and 1454 are associated with the wall 1414, and the peak 1456 is associated with the wall 1422.

At the process 1330, the intensities are converted. In one embodiment, as shown in FIG. 14(*c*), the curve 1440 is converted into a curve 1460. The conversion removes polarity differences between the peaks 1442 and 1452 and between the peaks 1444 and 1454. Additionally, the conversion also provide a smoothing process. For example, the intensity values of the curve 1440 is compared against the average intensity value of the curve 1440, and the absolute values of the differences are plotted along the direction of the reaction channel 1430. As a result, the curve 1460 includes three peaks 1472, 1474, and 1476. The peak 1472 corresponds to the peaks 1442 and 1452, the peak 1474 corresponds to the peaks 1444 and 1454, and the peak 1476 corresponds to the peak 1456. In one embodiment, the smoothing process ensures the peaks 1442 and 1452 are converted into a single peak 1472. In another embodiment of the present invention, the conversion is performed without the smoothing process. For example, the curve 1440 has a single peak with a single polarity in place of the peaks 1442 and 1452. No smoothing or fusing of the two peaks is needed.

At the process 1340, walls of the first control channel are detected. In one embodiment, as shown in FIG. 14(*c*), the peaks 1472 and 1474 are associated with the walls 1412 and 1414 of the first control channel 1410. A line 1488 is drawn parallel to the x axis along the direction of the reaction channel. The line 1488 intersects with the curve 1460 at four intersections 1482, 1484, 1486, and 1488. The average x value of intersections 1482 and 1484 and the average x value of the intersections 1486 and 1488 are calculated. The difference between the two average x values is determined as the calculated width of the interface line 1410. The calculated width is compared against the predetermined width of the interface line 1410. By moving the line 1488 up and down along the y direction, the difference between the calculated width and the predetermined width is minimized at a certain y position for the line 1488. At this y position, the average x value of intersections 1482 and 1484 is considered to be the position of the wall 1412, and the average x value of the intersections 1486 and 1488 is considered to be the position of the wall 1414.

At the process 1350, a wall of the second control channel is detected. In one embodiment, once the interface line 1410 is located, the predetermined length of the reaction channel 1430 between the interface line 1410 and the containment line 1420 is used to calculate the position of the containment line 1420. The calculation provides an approximate location for the wall 1422. Afterwards, the approximate locations for the walls 1414 and 1422 are further adjusted by a fine-correction process. The fine-correction process calculates the penalty functions for the wall 1414 and the wall 1416 and determines a combined penalty function as a function of wall positions. In one example, the combined penalty function takes into account the signal intensities of the curve 1460. In another example, the combined penalty function takes into account the distance between the fine-corrected wall positions and the approximate wall positions without fine correction. In yet another example, by minimizing the combined penalty function, the locations of the walls 1414 and 1422 are determined. In yet another example, by smoothing the combined penalty function, the locations of the walls 1414 and 1422 are determined.

As discussed above and further emphasized here, FIG. 13 is merely an example, which should not unduly limit the scope of the claims. One of ordinary skill in the art would recognize many variations, alternatives, and modifications. For example, the walls 1432 and 1434 of the reaction channel 1430 as shown in FIG. 14(*a*) are found in a way similar to the walls 1412, 1414, and 1422. The distance between the two walls 1432 and 1434 are predetermined. Multiple regions of the reaction channel 1430 are sampled to generate a composite estimate locations for the walls 1432 and 1434. In another example, the fiducial markings are detected and registered on the channel layer, and the walls 1432 and 1434 are thereby determined. In yet another example, the locations of the walls 1432, 1434, 1414 and 1422 can be determined based on at least information obtained from a bar code on the microfluidic device 30. In yet another example, as shown in FIG. 14(*a*), the region beyond the four bounding walls 1432, 1434, 1414 and 1422 can be masked out of the subsequent analysis.

Also, various fiducial markings can be included in the microfluidic system 30. In one embodiment, a fiducial marking comprises a recessed region in a deformable layer. The recessed region becomes a volume or open region surrounded by portions of the deformable layer or other layers. The volume or open region is preferably filled with a fluid such as a gas including air or other non-reactive fluid. The fluid also has a substantially different refractive index to light relative to the surrounding deformable layer. The open region is preferably filed with an air or air type mixture and has a low refractive index. Similarly, the fiducial marking in the control layer has similar characteristics according to a specific embodiment. In another embodiment, the fiducial marking has sharp edges that highlight the marking from its surroundings. In yet another embodiment, the fiducial markings can be any physical features associated with the microfluidic device 30. For example, the fiducial markings include a channel wall or an edge of the microfluidic device 30.

At the process 540, images are compared to generate a comparison image. For example, a comparison image results from the subtraction of the T0 image from the TM image. In another example, a comparison image results from the subtraction of the TM1 image from the TM2 image. Each of M1 and M2 is a positive integer smaller than or equal to N. For example, M1 is smaller than M2. Such removal can reduce false reading in the crystal recognition analysis. In another example, the mask generated in the process 530 is applied to the comparison image to create an attenuating front which softens the harsh borders that the mask would introduce to an image. The closer an image pixel is to a mask pixel, the more the image pixel is attenuated. In yet another example, the mask takes into account wall implosion by an implosion-padding process. As discussed above and further emphasized here, the process 540 may be skipped in some examples.

Figure 15:
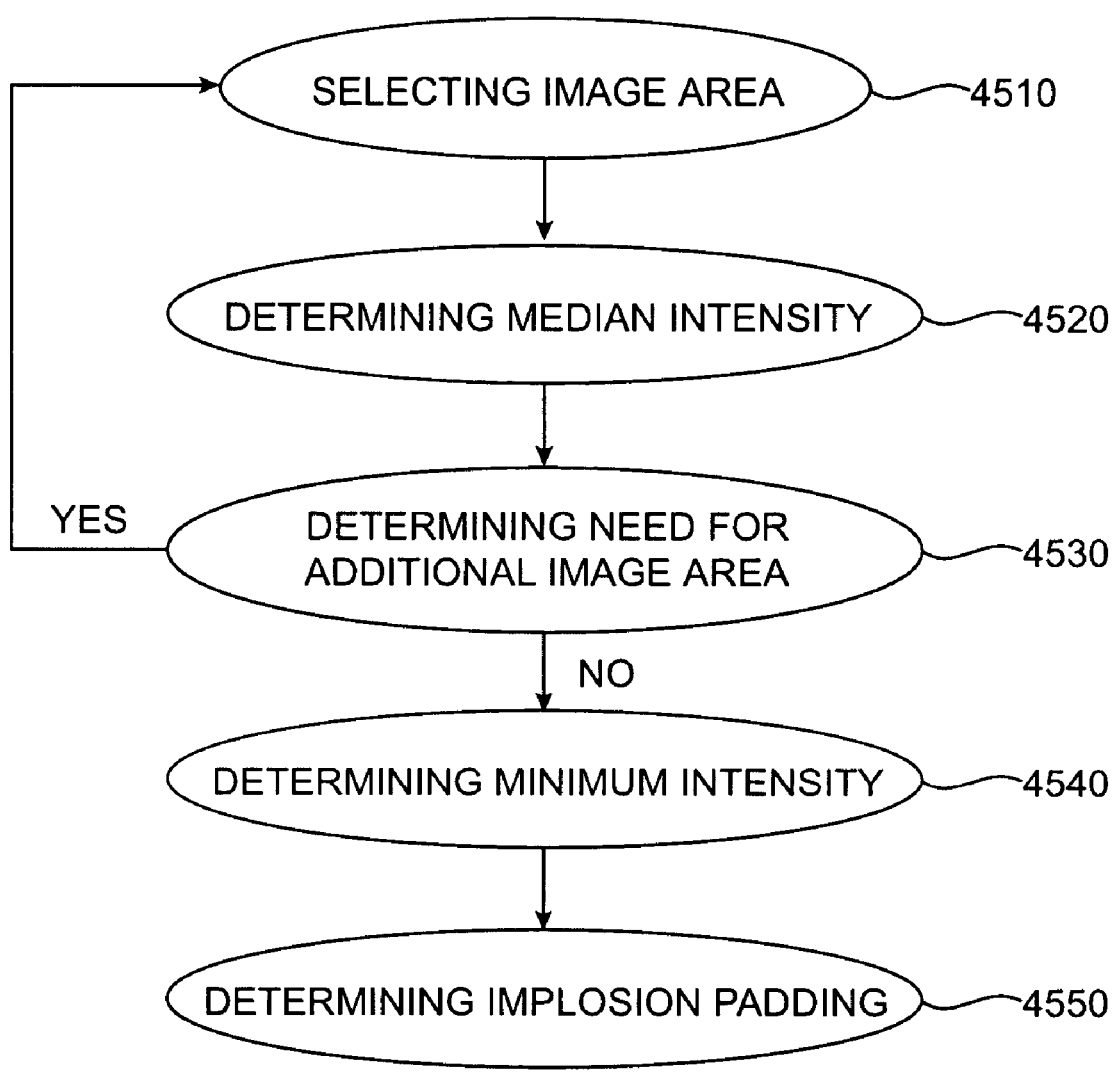
FIG. 15 is a simplified method for implosion padding according to an embodiment of the present invention.

FIG. 15 is a simplified method for implosion padding according to an embodiment of the present invention. This diagram is merely an example, which should not unduly limit the scope of the claims. One of ordinary skill in the art would recognize many variations, alternatives, and modifications. The method 4500 includes process 4510 for selecting image area, process 4520 for determining median intensity, process 4530 for determining need for additional image area, process 4540 for determining minimum intensity, and process 4550 for determining implosion padding. Although the above has been shown using a selected sequence of processes, there can be many alternatives, modifications, and variations. For example, some processes are combined or expanded. Other processes may be inserted to those noted above. Depending upon the embodiment, the specific sequences of processes may be interchanged with others replaced. Further details of these processes are found throughout the present specification and more particularly below.

Figure 16:
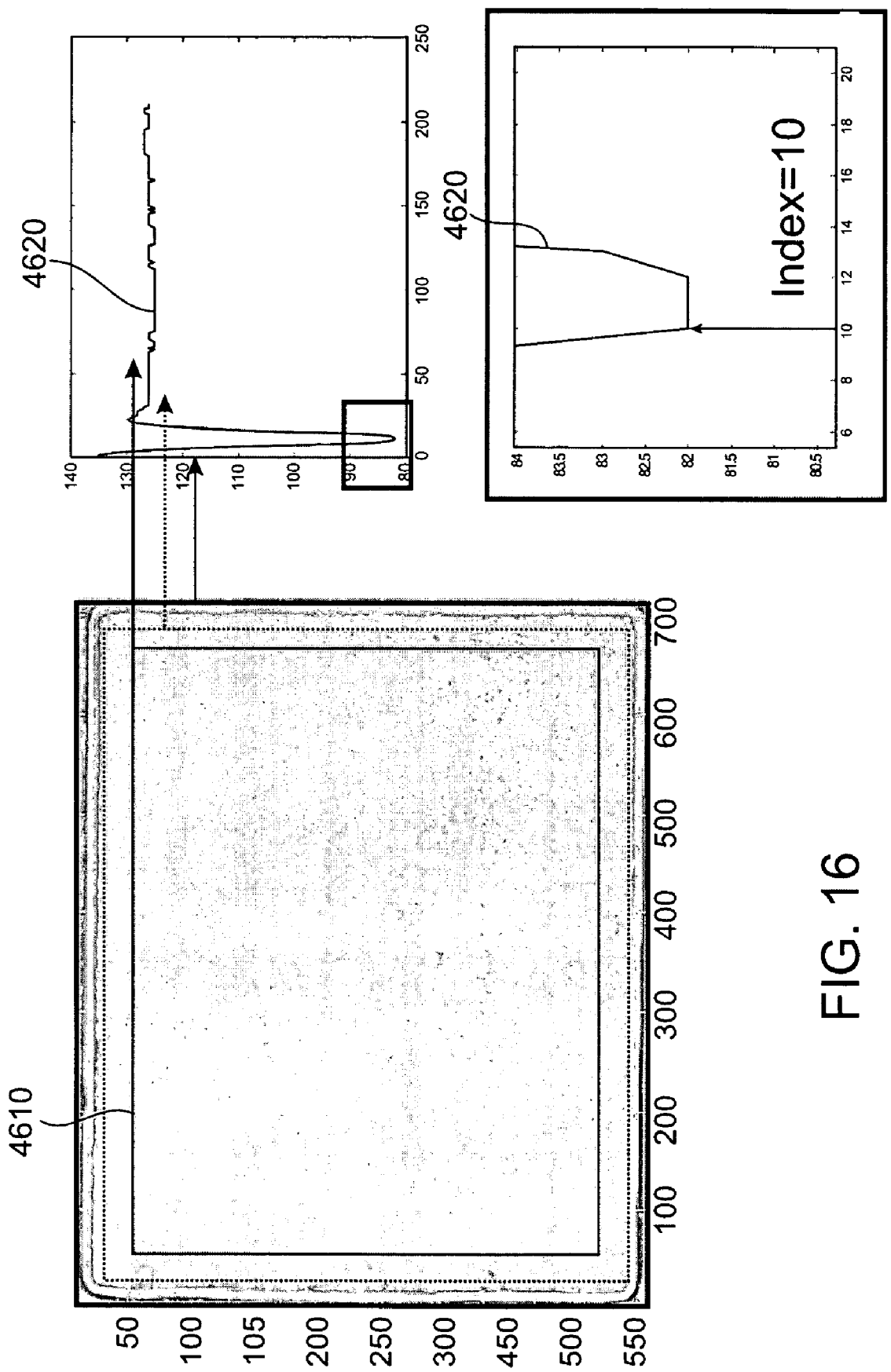
FIG. 16 is a simplified diagram for wall implosion according to an embodiment of the present invention.

At the process 4510, an image area is selected from the T0 image or the TM image. For example, the selected image area is associated with a rectangular boundary. FIG. 16 is a simplified diagram for wall implosion according to an embodiment of the present invention. This diagram is merely an example, which should not unduly limit the scope of the claims. One of ordinary skill in the art would recognize many variations, alternatives, and modifications. An image area along the perimeter of a rectangle 4610 is selected from an image. The rectangle 4610 is assigned with an index.

At the process 4520, a median intensity is determined. As shown in FIG. 16, the median intensity for the image area is calculated. The median intensity is associated with an index corresponding to the rectangle 4610, and determined based on raw pixel intensities along the perimeter of the rectangle 4610. In another embodiment, the average intensity instead of the median intensity for the image area is determined. At the process 4530, whether an additional image area should be selected is determined. If an additional image area needs to be selected, the process 4510 is performed. If an additional image area does not need to be selected, the process 4540 is performed. In one example, the processes 4520 and 4530 are repeated for a succession of nested rectangles and the rectangle index is plotted against the determined median intensity as shown in a curve 4620.

At the process 4540, the minimum median intensity is determined. As shown in FIG. 16, the median intensity is a function of the index, and may be plotted as the curve 4620. At an index equal to about 10, the median intensity approximately reaches a minimum. The rectangle associated with the minimum median intensity is related to the walls of the reaction chamber, and is used to determine the extent of implosion. In another embodiment, the minimum average intensity instead of the minimum median intensity for the image area is determined.

Figure 17:
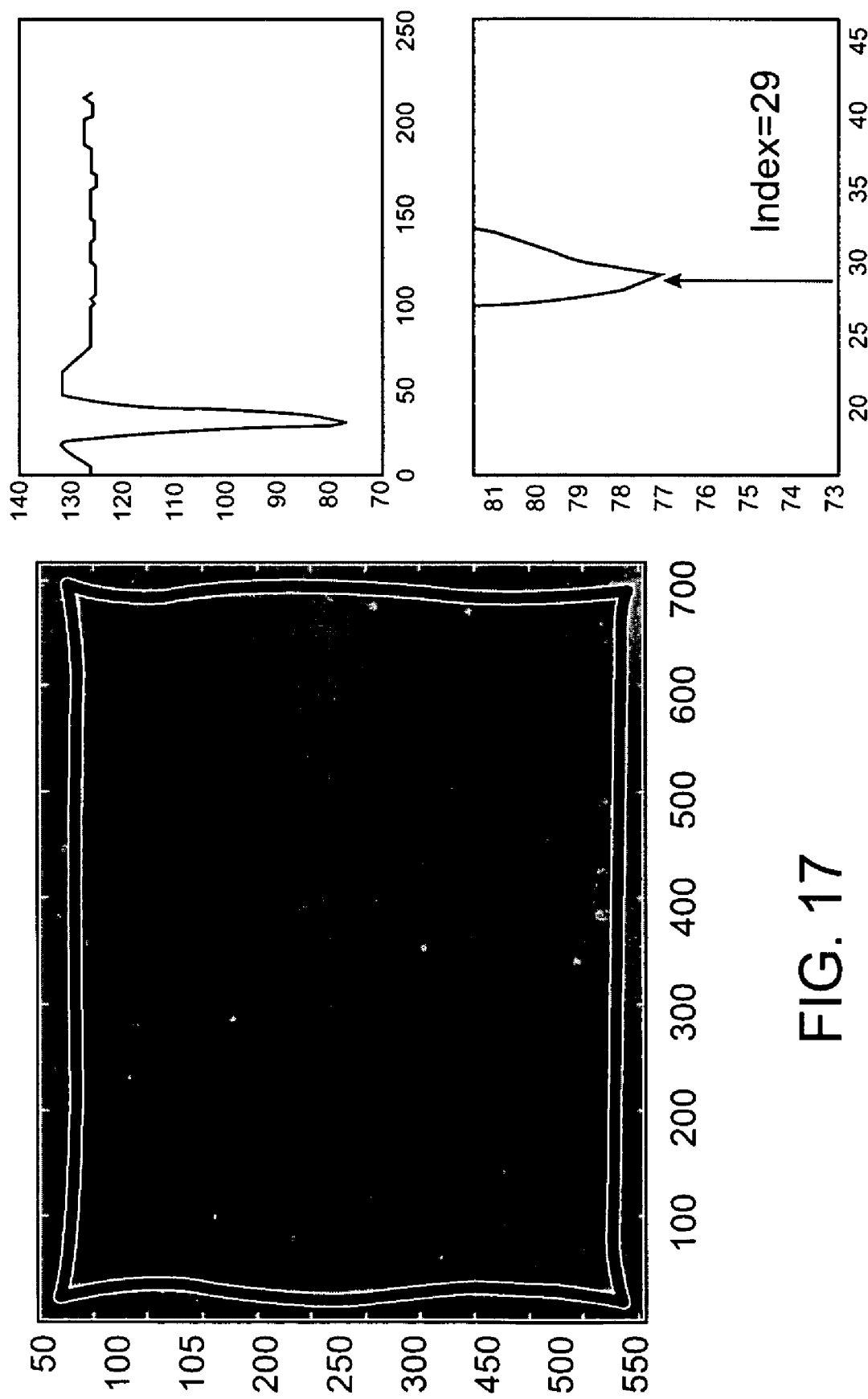
FIG. 17 is a simplified diagram for wall implosion at another time according to an embodiment of the present invention.

At the process 4550, the implosion padding is determined. FIG. 17 is a simplified diagram for wall implosion at another time according to an embodiment of the present invention. This diagram is merely an example, which should not unduly limit the scope of the claims. One of ordinary skill in the art would recognize many variations, alternatives, and modifications. FIG. 17 shows the processes 4510, 4520, 4530, and 4540 performed on an image taken later than the image analyzed in FIG. 16. For example, FIG. 16 is associated with the T0 image or the TM1 image. FIG. 17 is associated with TM2 image, and M2 is larger than M1. In FIG. 17, the index that corresponds to minimum median intensity has shifted from 10 to about 29. The change in index values indicates the wall implosion. Based on the location of the rectangles corresponding to the two index values, the additional implosion padding that should be applied for the image in FIG. 17 is determined. The mask can be designed to cover the wall implosion.

Figure 18:
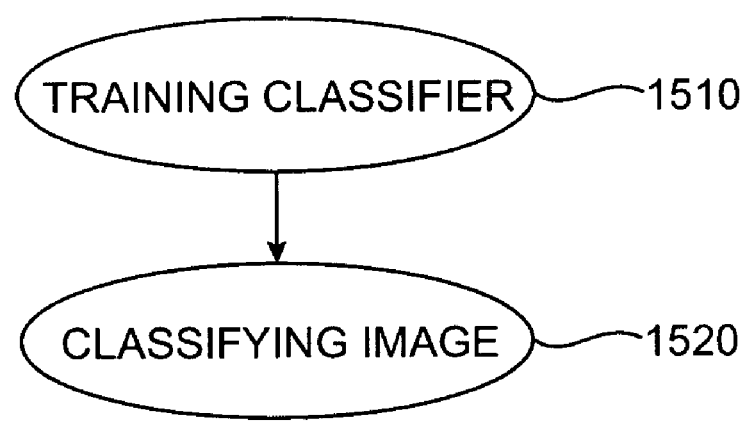
FIG. 18 is a simplified method for image inspection according to an embodiment of the present invention.

At a process 550, an image is inspected for crystals. For example, FIG. 18 is a simplified method for image inspection. This diagram is merely an example, which should not unduly limit the scope of the claims. One of ordinary skill in the art would recognize many variations, alternatives, and modifications. The method 1500 includes process 1510 for training classifier and process 1520 for classifying image. Although the above has been shown using a selected sequence of processes, there can be many alternatives, modifications, and variations. For example, some processes are combined or expanded. Other processes may be inserted to those noted above. Depending upon the embodiment, the specific sequences of processes may be interchanged with others replaced. For example, the process 1510 is skipped. In another example, the process 1510 is repeated for a plurality of images. Further details of these processes are found throughout the present specification and more particularly below.

Figure 19:
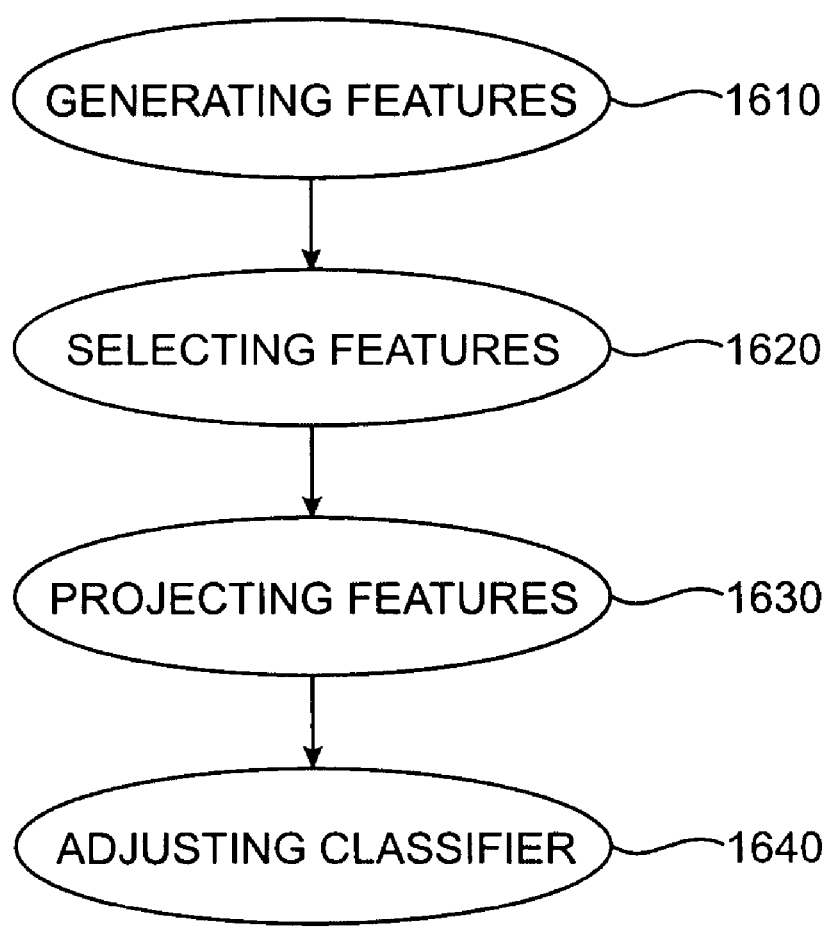
FIG. 19 is a simplified training method according to an embodiment of the present invention.

At the process 1510, a classifier is trained. FIG. 19 is a simplified training method according to an embodiment of the present invention. This diagram is merely an example, which should not unduly limit the scope of the claims. One of ordinary skill in the art would recognize many variations, alternatives, and modifications. The process 1510 includes process 1610 for generating features, process 1620 for selecting features, process 1630 for projecting features, and process 1640 for adjusting classifier. Although the above has been shown using a selected sequence of processes, there can be many alternatives, modifications, and variations. For example, some processes are combined or expanded. Other processes may be inserted to those noted above. Depending upon the embodiment, the specific sequences of processes may be interchanged with others replaced. Further details of these processes are found throughout the present specification and more particularly below.

At the process 1610, a number of features are generated. In one embodiment, the features are computed on the entire image. In another embodiment, the image is divided into overlapping tiles or spatial components, and the features are computed on each image tile or spatial component. These features describe certain characteristics of the image useful for the classification of the image. For example, the image can be classified into crystal, phase/precipitate and clear types.

In one embodiment, some characteristics of the image are predetermined. The predetermination is accomplished by manually and/or automatically inspecting the image. The characteristics may describe with which of the crystal, phase/precipitate and clear classes the image is associated. The predetermined characteristics can be used to assess the accuracy and adjust the various settings of the classifier.

In one embodiment, the features including some or all of the following:

Coarse Image Statistics: global image features;

Circle Counting Image Statistics: count of different kinds of circles and ellipse;

Sliding Threshold Features: threshold values at which objects of sufficient size are segmented;

Biggest Object Features: features of the biggest blob or object found in the image;

Discrete Fourier Transform Features: frequency analysis features;

Form Analysis Features: shape analysis features;

X-axis Symmetry Features: features describing the symmetry around X-axis;

Canny Image Sign Flipping Features: features describing the flipping of sign using Canny edge detector;

Hough Transform Features: features computed using Hough Transform method to detect straight lines; and Neighborhood Line Detector Features: features computed in local neighborhoods detecting straight line patterns.

The above list of features is merely an example, which should not unduly limit the scope of the claims. One of ordinary skill in the art would recognize many variations, alternatives, and modifications. In one embodiment, for neighborhood line detector features, a N-by-N-pixel square neighborhood is centered around each pixel in the image and considered for a fixed value of N. For example, N is equal to 9. The gradient of each pixel in the neighborhood is computed. Based on all the gradients of the pixels in the neighborhood, the dominant orientation angle indicative of the straight line pattern in the neighborhood is determined. Also, based on the number of pixels in the neighborhood aligned with the dominant orientation, the strength of the straight line pattern is determined. If there are a number of pixels forming a line and each of the neighborhoods centered at those pixels has strong and similarly oriented straight line patterns, the number of such pixels and the strength and similarity of orientations can be used as features for classification At the process 1620, certain features are selected from the plurality of features generated. For example, a subset of features is selected using an automatic method in which features are added and removed iteratively and classification accuracy is improved or optimized. In one embodiment, the feature selection process is repeated for each pair of the classes, and the accuracy for distinguishing between each pair of classes is improved. The accuracy may be determined between the result from the classifier and the predetermined characteristic of the image. For example, the image is associated with three classes including crystal, phase/precipitate and clear. In another example, for each pair of classes, certain features are selected from all the features obtained at the process 1610.

The selection includes computing the Fisher Discriminant between the pair and evaluating its classification accuracy using receiver operating characteristic (ROC) curve area which is a plot between false negative rate and false positive rate. For three pairs of classes, three groups of selected features are determined. Each group corresponds to a pair of class, and may be different from or the same as another group. Additionally, only for the Neighborhood Line Detector Features obtained at the process 1610, the feature selection process is performed. For example, the selection is related to two out of three pairs of classes, and two groups of selected Neighborhood Line Detector Features are determined. In yet another embodiment, the three classes can be subdivided using a clustering algorithm in order to use pairs of subclasses for the feature selection process.

At the process 1630, the selected features are projected. In one embodiment, all of the selected features are projected onto the lower dimensional feature space. For example, from 130 original features, 5 groups of features are selected. As discussed above, 3 groups of features are selected from all features for 3 pairs of classes, and 2 groups of features are selected from only Neighborhood Line Detector Features for 2 pairs of classes. These 5 groups of selected features are used to calculate 5 Fisher features. The number of dimensions is reduced from 130 to 5.

At the process 1640, the classifier is adjusted. In one embodiment, the Fisher features are input to a Feed Forward neural network. This network is trained using a neural network training algorithm such as backpropagation algorithm. The neural network can have multiple outputs, each output indicating the likelihood of the image or the image tile being in one of the classes such as crystal, phase/precipitate or clear. If the image is divided into image tiles, the neural network outputs for the different image tiles are combined into a single output using a spatial fusion algorithm. Based on the comparison between the output from the neural network and the predetermined characteristics of the image, the neural network is adjusted. For example, the weights and/or biases of the neural network is changed.

Figure 20:
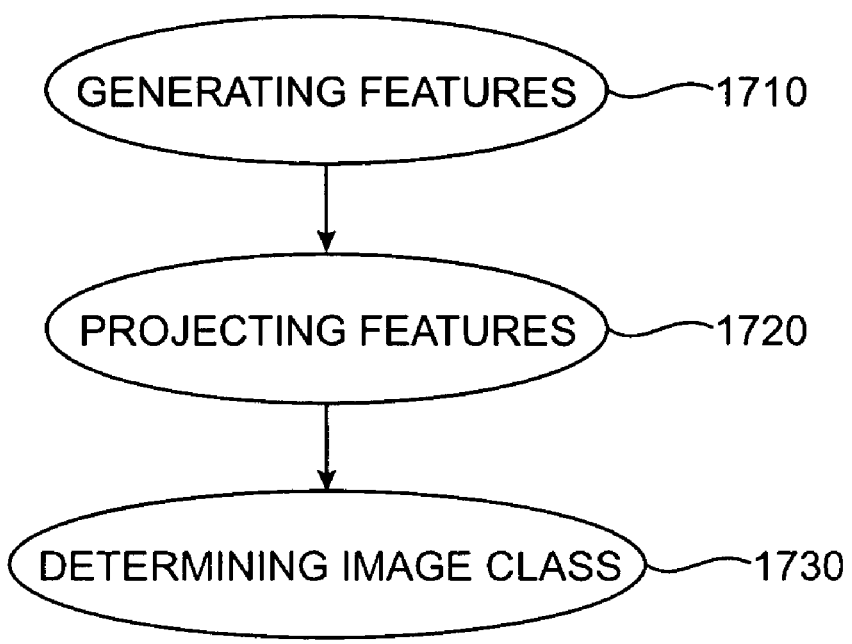
FIG. 20 is a simplified method for classification according to an embodiment of the present invention.

At the process 1520, an image is classified. FIG. 20 is a simplified method for classification according to an embodiment of the present invention. This diagram is merely an example, which should not unduly limit the scope of the claims. One of ordinary skill in the art would recognize many variations, alternatives, and modifications. The process 1520 includes process 1710 for generating features, process 1720 for projecting features, and process 1730 for determining image class. Although the above has been shown using a selected sequence of processes, there can be many alternatives, modifications, and variations. Other processes may be inserted to those noted above. Depending upon the embodiment, the specific sequences of processes may be interchanged with others replaced. Further details of these processes are found throughout the present specification and more particularly below.

At the process 1710, a number of features are generated. These features include all the features selected at the process 1620. In one embodiment, the features are computed on the entire image. In another embodiment, the image is divided into overlapping tiles or spatial components, and the features are computed on each image tile or spatial component. In yet another embodiment, the scrubbing and ripping operations are performed on the image prior to the process 1710.

At the process 1720, the selected features are projected. In one embodiment, all of the features selected at the process 1620 are projected onto the lower dimensional feature space. For example, from 130 original features, 5 groups of features are selected at the process 1620. These selected features are computed at the process 1710, and are used to calculate 5 Fisher features.

At the process 1730, the image class is determined. In one embodiment, the Fisher features are input to a Feed Forward neural network. The neural network can have multiple outputs, each output indicating the likelihood of the image or the image tile being in one of the classes such as crystal, phase/precipitate or clear. If the image is divided into image tiles, the neural network outputs for the different image tiles are combined into a single output using a spatial fusion algorithm. In another embodiment, the crystal likelihood is compared against a threshold. If the crystal likelihood is above the threshold, the image is classified as a crystal image. For example, the threshold is 50%.

As discussed above and further emphasized here, FIGS. 1-17 represent certain embodiments of the present invention, and these embodiments include many examples. For example, the T0 image and/or the TM image associated with some or all of the processes 510, 520, 530, 540, and 550 may be directly acquired by the imaging system 10, or generated from a plurality of images acquired by the imaging system 10. In one embodiment of the present invention, the imaging system 10 captures a plurality of images for the same area of the microfluidic system 30 at a plurality of z-focus positions respectively. The plurality of images at different z-planes are combined into one image used as the T0 image or TM image.

Figure 21:
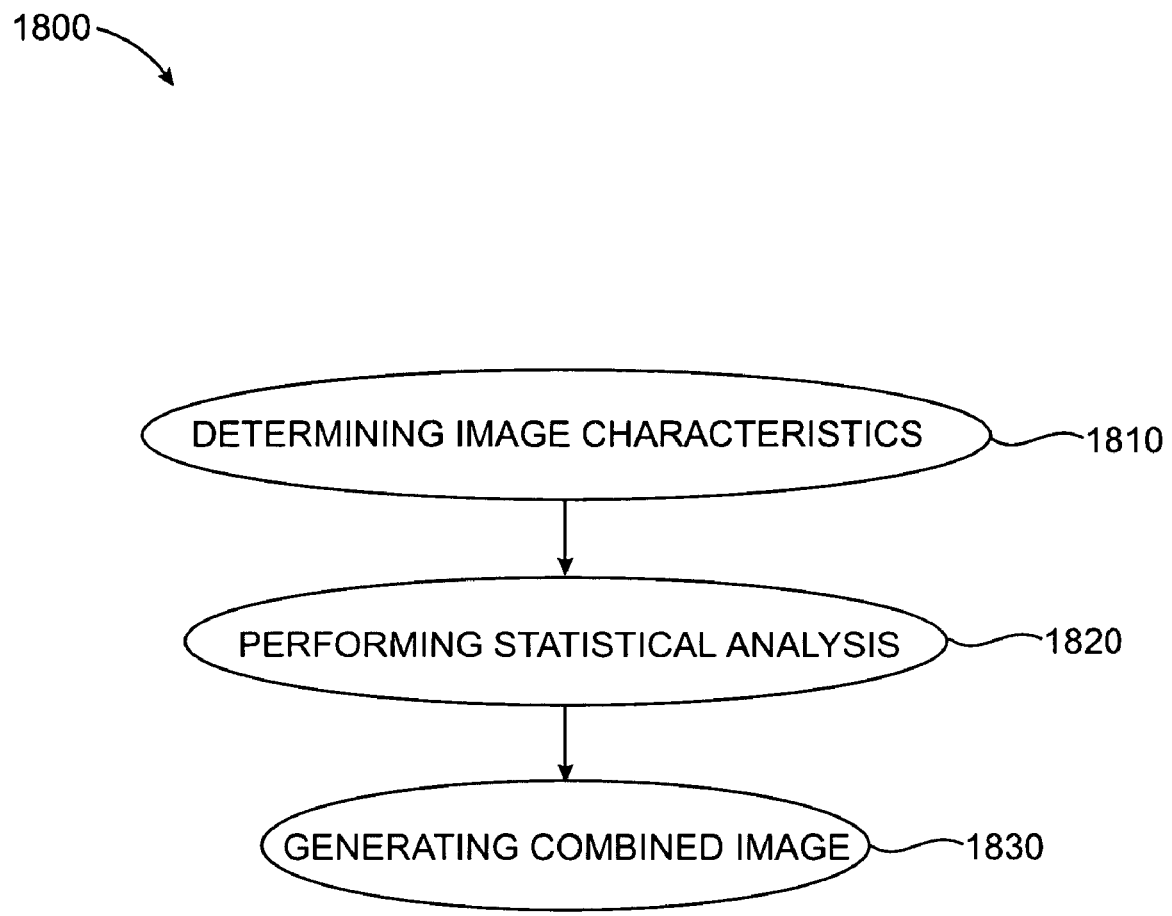
FIG. 21 is a simplified method for combining images according to an embodiment of the present invention.

FIG. 21 is a simplified method for combining images according to an embodiment of the present invention. This diagram is merely an example, which should not unduly limit the scope of the claims. One of ordinary skill in the art would recognize many variations, alternatives, and modifications. The method 1800 includes process 1810 for determining image characteristics, process 1820 for performing statistical analysis, and process 1830 for generating combined image. Although the above has been shown using a selected sequence of processes, there can be many alternatives, modifications, and variations. For example, some processes are combined or expanded. Other processes may be inserted to those noted above. Depending upon the embodiment, the specific sequences of processes may be interchanged with others replaced. Further details of these processes are found throughout the present specification and more particularly below.

At the process 1810, certain image characteristics are determined for the plurality of images. In one embodiment, for each pixel of each image, the sharpness and colorness are determined. For example, the sharpness is determined with Laplacian operator, and the colorness is determined with Saturation of the HSV color mode. At the process 1820, a statistical analysis is performed. In one embodiment, the statistics such as mean of sharpness and mean of colorness are determined for all the images.

At the process 1830, a combined image is generated. For example, $$\text{Combined Image}(x, y) = \frac{\sum_{m=1}^{N} wt_m(x, y) \times Image_m(x, y)}{\sum_{m=1}^{N} wt_m(x, y)} \quad \text{(Equation 1)}$$

wherein N is the number of images for the plurality of images. CombinedImage (x,y) is the intensity of the combined image at pixel (x,y), and Image$_m$(x,y) is the intensity of image m at pixel (x,y). For example, the image intensity has three components including red intensity, green intensity, and blue intensity. The intensity of the combined image associated with a given color is dependent upon the intensity of image m associated with the same color. The weight wt$_m$ is determined based on the sharpness and colorness at pixel (x, y) for image m. For example, $$wt_m(x, y) = 0.7 \times \frac{Laplacian_m(x, y)}{MeanLapcian} + 0.3 \times \frac{Saturation_m(x, y)}{MeanSaturation} \quad \text{(Equation 2)}$$

wherein Lapacian$_m$(x,y) and Saturation$_m$(x,y) are the values of Laplacian operator and Saturation respectively for the pixel (x,y) on image m. MeanLaplacian is the mean of Laplacian values for all pixels in all of the plurality of images, and MeanSaturation is the mean of Saturation values for all pixels in all the plurality of images.

Figure 22:
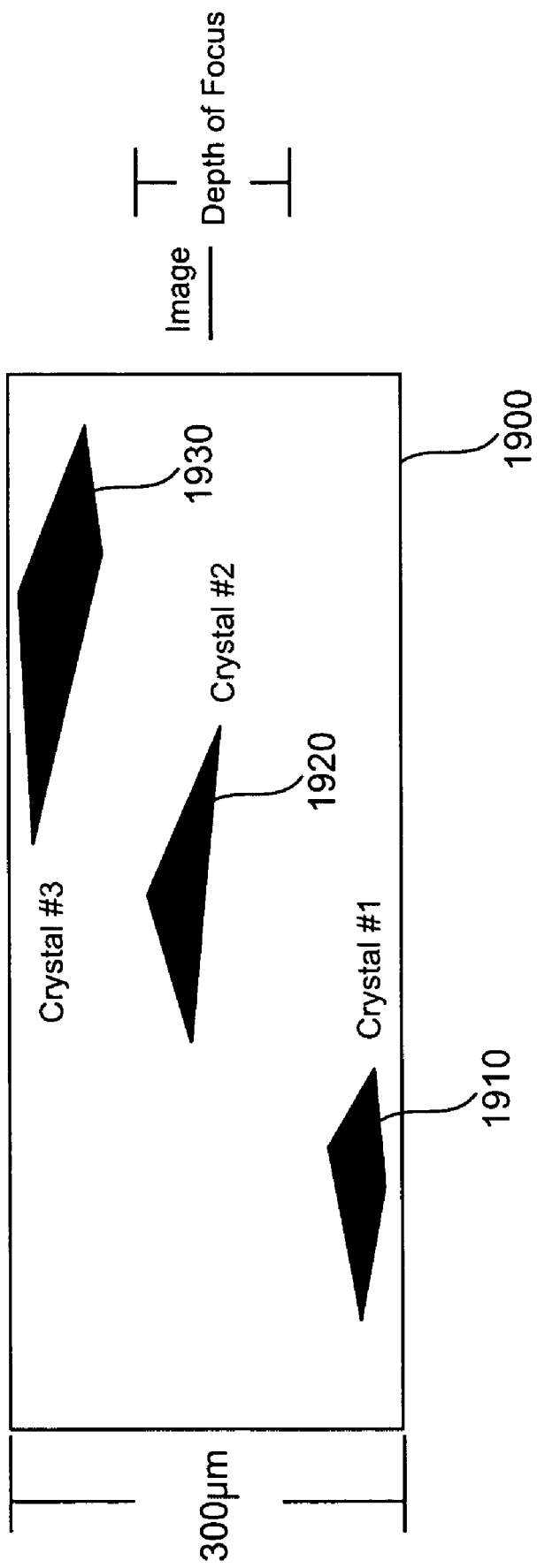
FIG. 22 is a simplified diagram for deep chamber according to an embodiment of the present invention.

The method for combining images has various applications. For example, in certain microfluidic devices, a reaction chamber, such as a reaction channel or the protein well, has a large depth. The crystals can be located anywhere within the reaction chamber. FIG. 22 is a simplified diagram for deep chamber according to an embodiment of the present invention. This diagram is merely an example, which should not unduly limit the scope of the claims. One of ordinary skill in the art would recognize many variations, alternatives, and modifications. A protein well 1900 has a depth of about 300 microns. In one example, the depth of focus of 10× objective is less than 300 microns, and the single z-plane image capture cannot capture all the crystals 1910, 1920, and 1930. If the imaging system focuses on the middle of the protein well, the image may capture only the crystal 1920.

Figure 23:
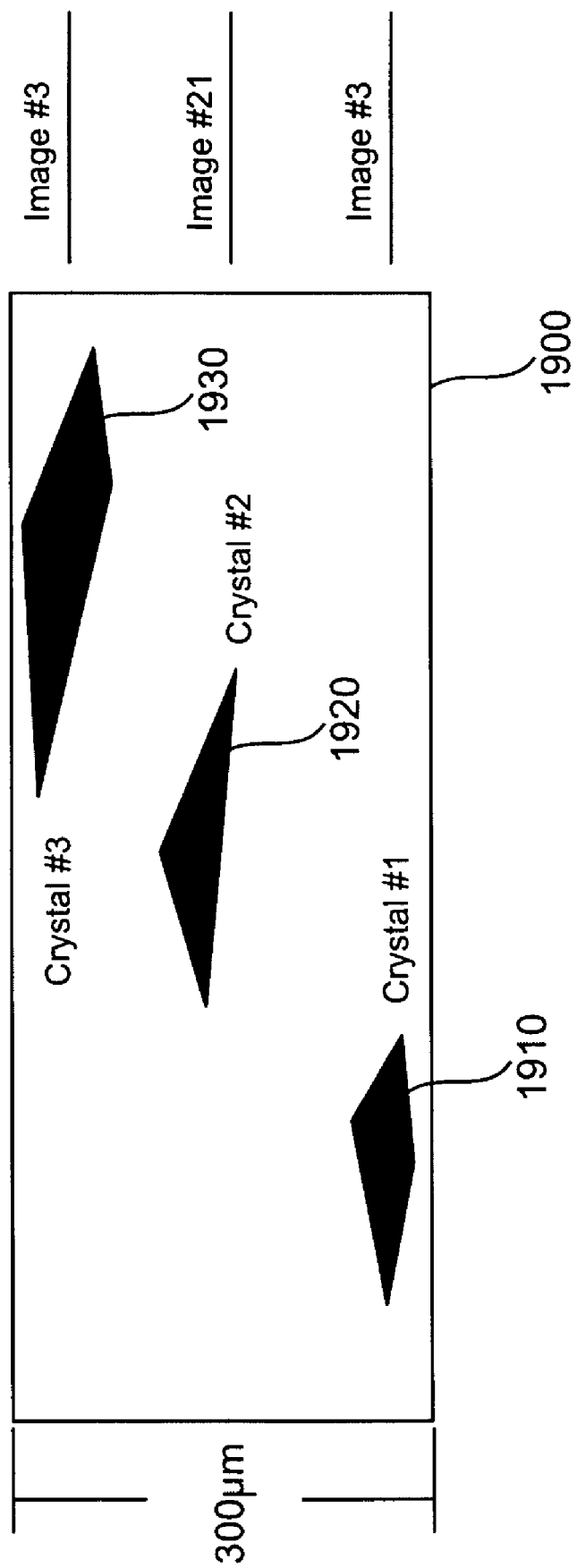
FIG. 23 is a simplified diagram for capturing multiple images according to an embodiment of the present invention.

FIG. 23 is a simplified diagram for capturing multiple images according to an embodiment of the present invention. This diagram is merely an example, which should not unduly limit the scope of the claims. One of ordinary skill in the art would recognize many variations, alternatives, and modifications. In one example, three images are acquired. Image #1 captures the crystal 1910, Image #2 captures the crystal 1920, and Image #3 captures the crystal 1930. The number of images are depending on the objective and aperture setting of the imaging system. The smaller the aperture, the larger of the depth of field, and the less the images needed. For example, 5 images with 70 micron step size may be used with 10× objective. The captured multiple images are combined according to the method 1800.

In one embodiment, each of the three images has three components for a given (x, y) location. The three components include red intensity, green intensity, and blue intensity. Similarly, the combined image has the same three components for a given (x, y) location. For example, at the pixel location (10, 10), Image$_1$ (10, 10)=(200, 100, 50), Image$_2$ (10, 10)=(100, 200, 150) and Image$_3$ (10, 10)=(50, 50, 50). The corresponding weights are wt$_1$ (10, 10)=0.1, wt$_2$ (10, 10)=10 and wt$_3$ (10, 10)=0.2. According to Equation 1, CombinedImage (10, 10) is as follows:

$$CombinedImage(10, 10) = [wt_1(10, 10) \times Image_1(10, 10) + \quad \text{(Equation 3)}$$
$$wt_2(10, 10) \times Image_2 + wt_3(10, 10) \times$$
$$Image_3(10, 10)] / [wt_1(x, y) + wt_2(x, y) +$$

-continued
$$wt_3(x, y)] = [0.1 \times (200, 100, 5) +$$
$$10 \times (100, 200, 150) + 0.2 \times (50, 50, 50)] /$$
$$(0.1 + 10.0 + 0.2) =$$
$$((0.1 \times 200 + 10 \times 100 + 0.2 \times 50) / 10.3,$$
$$(0.1 \times 100 + 10 \times 200 + 0.2 \times 50) / 10.3,$$
$$(0.1 \times 50 + 10 \times 150 + 0.2 \times 50) / 10.3)) =$$
$$(100, 196.12, 147.09)$$

where the combined image has a red intensity of 100, a green intensity of 196.12, and a blue intensity of 147.09 at x equal to 10 and y equal to 10. As discussed above and further emphasized here, Equation 3 is only an example, which should not unduly limit the scope of the claims. One of ordinary skill in the art would recognize many variations, alternatives, and modifications.

Examples of the present invention include code that directs a processor to perform all or certain inventive processes as discussed above. The computer code is implemented using C++ or other computer language. The computer code is not intended to limit the scope of the claims herein. One of ordinary skill in the art would recognize other variations, modifications, and alternatives.

According to one embodiment of the present invention, a computer-readable medium includes instructions for processing an image of a microfluidic device. The computer-readable medium includes one or more instructions for receiving a first image of a microfluidic device. The first image includes a first fiducial marking and a first chamber region, and the first chamber region is associated with a first chamber boundary. Additionally, the computer-readable medium includes one or more instructions for transforming the first image into a first coordinate space based on at least information associated with the first fiducial marking, and one or more instructions for removing at least a first part of the first chamber boundary from the first image. Moreover, the computer-readable medium includes one or more instructions for processing information associated with the first chamber region, and one or more instructions for determining whether a first crystal is present in the first chamber region.

According to another embodiment of the present invention, a computer-readable medium includes instructions for processing a plurality of images of a microfluidic device. The computer-readable medium includes one or more instructions for receiving at least a first image and a second image of a microfluidic device. The first image and the second image are associated with a first focal position and a second focal position respectively, and each of the first image and the second image includes a first chamber region. Additionally, the computer-readable medium includes one or more instructions for processing information associated with the first image and the second image, and one or more instructions for generating a third image based on at least information associated with the first image and the second image. Moreover, the computer-readable medium includes one or more instructions for processing information associated with the third image, and one or more instructions for determining whether a first crystal is present in the first chamber region based on at least information associated with the third image.

According to yet another embodiment of the present invention, a computer-readable medium includes instructions for adjusting a classifier and processing an image of a microfluidic device. The computer-readable medium includes one or more instructions for receiving a first image of a microfluidic device. The first image is associated with at least a first predetermined characteristic. Additionally, the computer-readable medium includes one or more instructions for generating a first plurality of features based on at least information associated with the first image, and one or more instructions for selecting a second plurality of features from the first plurality of features based on at least information associated with the first plurality of features and the at least a first predetermined characteristic. Moreover, the computer-readable medium includes one or more instructions for determining a third plurality of features based on at least information associated with the second plurality of features, and one or more instructions for processing information associated with the third plurality of features. Also, the computer-readable medium includes one or more instructions for determining at least a first likelihood based on at least information based on the third plurality of features and a first plurality of parameters, one or more instructions for processing information associated with the first likelihood and the at least a first predetermined characteristic, and one or more instructions for adjusting the first plurality of parameters based on at least information associated with the first likelihood and the at least a first predetermined characteristic.

In yet another embodiment, at the process 1350, a wall of the second control channel is detected. In one embodiment, once the interface line 1410 is located, the predetermined length of the reaction channel 1430 between the interface line 1410 and the containment line 1420 is used to calculate the position of the containment line 1420. The calculation provides an approximate location for the wall 1422. Afterwards, the approximate locations for the walls 1414 and 1422 are further adjusted by a fine-correction process. An exemplary computer code for fine correction is shown below.

```
int DiffusionCellImageTemplate::fineCorrectProteinChannelLocation(IplImage* t0Image,int
proteinChannelBeginningInPixels, int totalProteinChannelLengthInPixels)
{
int
fineTuneDistance=CONTROL_LAYER_FINE_TUNE_DISTANCE_IN_MICRONS/this-
>m_engineConfiguration->getXMicronsPerPixel( );
this->StartImageTimer("fine correction start");
RECT leftRect;
RECT rightRect;
leftRect.top=0;
leftRect.bottom=t0Image->height-1;
leftRect.left=proteinChannelBeginningInPixels-fineTuneDistance/2;
leftRect.right=proteinChannelBeginningInPixels+fineTuneDistance/2;
rightRect.top=0;
rightRect.bottom=t0Image->height-1;
rightRect.left=proteinChannelBeginningInPixels+totalProteinChannelLengthInPixels-
fineTuneDistance/2;
rightRect.right=proteinChannelBeginningInPixels+totalProteinChannelLengthInPixels+fineTune
Distance/2;
IplImage* leftSide=ImageProcessor::extractImageRect(t0Image,&leftRect);
IplImage* rightSide=ImageProcessor::extractImageRect(t0Image,&rightRect);
int returnValue=proteinChannelBeginningInPixels;
if ((leftSide==NULL)||(rightSide==NULL))
{
// no additional calculation done here - simply return the base protein channel beginning
}
else
{
this->PollImageTimer("both images non-null");
// PERFORM THE FINE CORRECTION CALCULATION HERE
int *leftSignal=ImageProcessor::calculateHorizontalDerivativeAmplitude(leftSide);
int *rightSignal=ImageProcessor::calculateHorizontalDerivativeAmplitude(rightSide);
// this->PollImageTimer("calculated derivative signals");
if ((leftSignal!=NULL)&&(rightSignal!=NULL))
{
this->PollImageTimer("both are non-null");
int signalWidth=leftSide->width;
int minLeftSignal=INT_MAX;
int minRightSignal=INT_MAX;
// determine the min of each signal
for (int i=0;i<signalWidth-1;i++) // skip the last value as it is always zero
{
if (leftSignal[i]<minLeftSignal)
minLeftSignal=leftSignal[i];
if (rightSignal[i]<minRightSignal)
minRightSignal=rightSignal[i];
}
// now subtract the min value
for (i=0;i<signalWidth-1;i++) // skip the last value as it is always zero
{
leftSignal[i]-=minLeftSignal;
rightSignal[i]-=minRightSignal;
}
```

```
// now interrogate the possible benefit from each of the possible fine tuning values
this->PollImageTimer("calculating penality function for each side");
int *leftPenality=new int[signalWidth];
int *rightPenality=new int[signalWidth];
int leftSum=0;
int rightSum=0;
for (i=0;i<signalWidth;i++)
{
// calculate the sum to determine to normalize left and right side
leftSum+=leftSignal[i];
rightSum+=rightSignal[i];
// now calculate the penalty for each side
leftPenality[i]=0;
rightPenality[i]=0;
// left penality are all the signal contributions to the left of this perturbation
  for (int j=0;j<i;j++)
  {
  rightPenality[i]+=rightSignal[j];
  }
  // right penality includes all the signal contributions to the right of this pertubation
  for (j=signalWidth-1;j>=i;j--)
  {
  leftPenality[i]+=leftSignal[j];
  }
}
// calculate the combined penalty as a sum of the normalized penalty contribution from
// each side of the signal
this->PollImageTimer("calculating combined penality function");
double *combinedPenality=new double[signalWidth];
double *combinedPenalityRaw=new double[signalWidth];
for (i=0;i<signalWidth;i++)
{
  double leftValue=((double)leftPenality[i])/(leftSum);
  double rightValue=((double) rightPenality[i])/(rightSum);
  // unless we're in the area in which we can average...
  combinedPenalityRaw[i]=rightValue+leftValue;
}
  // smooth the penalty function to force the minimum peak to the center of the acceptable
band
  // and calculate the minimum index
  double minPenality=1e99;
  int minPenalityIndex=0;
  int smoothingWindow=SMOOTHING_WINDOW_FOR_CONTROL_LINE_DETERMINATION/
this->m_engineConfiguration->getXMicronsPerPixel( );
  for (i=0;i<signalWidth;i++)
  {
  int left=i-smoothingWindow;
  int right=i+smoothingWindow;
  if (left<0) left=0;
  if (right>signalWidth-1) right=signalWidth-1;
  combinedPenality[i]=0;
  for (int j=left; j<=right;j++)
  {
  combinedPenality[i]+=combinedPenalityRaw[j];
  }
  combinedPenality[i]/=(right-left); // normalize based on how much we were able to
integrate
  if (combinedPenality[i]<minPenality)
  {
  minPenality=combinedPenality[i];
  minPenalityIndex=i;
  }
}
this->PollImageTimer("calculating offset");
  // apply the fine correction to our return value
  returnValue+=minPenalityIndex-signalWidth/2; // subtract half the signal width since this
was zero centered
//#define DEBUG_FINE_CORRECT_CHANNEL
#ifdef DEBUG_FINE_CORRECT_CHANNEL
  double *xValues=new double[leftSide->width];
  double *yValues1=new double[leftSide->width];
  double *yValues2=new double[leftSide->width];
  double *yValues3=new double[leftSide->width];
  double *yValues4=new double[leftSide->width];
  for (int ii=0;ii<signalWidth;ii++)
  {
    xValues[ii]=ii;
    yValues1[ii]=leftSignal[ii];
```

-continued

```
    yValues2[ii]=rightSignal[ii];
    yValues3[ii]=((double)leftPenality[ii])/leftSum*2;
    yValues4[ii]=((double)rightPenality[ii])/rightSum*2;
  }
  CVGraphUtility newGraph;
newGraph.plotDoubleXYData(xValues,yValues1,signalWidth,xValues,yValues2,signalWidth,"HorizontalDerivativeSignals");
  CVGraphUtility newGraph2;
newGraph2.plotTripleXYData(xValues,yValues3,signalWidth,xValues,yValues4,signalWidth,
    xValues,combinedPenality,signalWidth,"Penality Function");
    delete[ ] xValues;
    delete[ ] yValues1;
    delete[ ] yValues2;
    delete[ ] yValues3;
    delete[ ] yValues4;
#endif
  // free up values
  if (combinedPenality!=NULL)
  {
   delete[ ] combinedPenality;
   combinedPenality=0;
  }
  if (combinedPenalityRaw!=NULL)
  {
   delete[ ] combinedPenalityRaw;
   combinedPenalityRaw=0;
  }
  if (leftPenality!=NULL)
  {
   delete[ ] leftPenality;
   leftPenality=0;
  }
  if (rightPenality!=NULL)
  {
   delete[ ] rightPenality;
   rightPenality=0;
  }
 }
 if (leftSignal!=NULL)
 {
  delete[ ] leftSignal;
  leftSignal=0;
 }
 if (rightSignal!=NULL)
 {
  delete[ ] rightSignal;
  rightSignal=0;
 }
}
if (leftSide!=NULL)
 cvReleaseImage(&leftSide);
if (rightSide!=NULL)
 cvReleaseImage(&rightSide);
this->StopImageTimer( );
return returnValue;
}
```

As discussed above and further emphasized here, the above examples of computer-readable medium and computer code are merely examples, which should not unduly limit the scope of the claims herein. One of ordinary skill in the art would recognize many variations, alternatives, and modifications. For example, some processes may be achieved with hardware while other processes may be achieved with software. Some processes may be achieved with a combination of hardware and software. Although the above has been shown using a selected sequence of processes, there can be many alternatives, modifications, and variations. For example, some of the processes may be expanded and/or combined. Depending upon the embodiment, the specific sequence of processes may be interchanged with others replaced.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for processing an image of a microfluidic device, the method comprising:
   receiving a first image of a microfluidic device, the first image corresponding to a first state;
   receiving a second image of the microfluidic device, the second image corresponding to a second state;
   transforming the first image into a third coordinate space, using a processor, the transforming using at least a first fiducial on the first image;
   transforming the second image into the third coordinate space, using the processor, the transforming using at least a second fiducial on the second image;

obtaining a third image based on at least information associated with the transformed first image and the transformed second image;

processing the third image to obtain information associated with the first state and the second state using the processor.

2. The method of claim 1, the method further comprising:
locating the at least a first fiducial on the first image;
locating the at least a second fiducial on the second image.

3. The method of claim 1 wherein the transforming the first image into a third coordinate space comprises:
associating the at least a first fiducial to at least a third fiducial in the third coordinate space;
performing a first transformation to the first image based on at least information associated with the at least a first fiducial and the at least a third fiducial.

4. The method of claim 3 wherein the performing a first transformation comprises:
estimating the first transformation based on at least information associated with the at least a first fiducial and the at least a third fiducial;
converting the first image into the third coordinate space, the converting using the first transformation.

5. The method of claim 4 wherein the transforming the second image into the third coordinate space comprises:
associating the at least a second fiducial to the at least a third fiducial in the third coordinate space;
performing a second transformation to the second image based on at least information associated with the at least a second fiducial and the at least a third fiducial.

6. The method of claim 5 wherein the performing a second transformation comprises:
estimating the second transformation based on at least information associated with the at least a second fiducial and the at least a third fiducial;
converting the second image into the third coordinate space, the converting using the second transformation.

7. The method of claim 1 wherein the obtaining a third image comprises:
obtaining a difference between the first image and the second image.

8. The method of claim 7 wherein the obtaining a third image further comprises:
masking at least a first part of the first image, the at least a first part free from information associated with the first state;
masking at least a second part of the second image, the at least a second part free from information associated with the second state.

9. The method of claim 8 wherein the at least a second part corresponds to the at least a first part, the at least a second part based on at least information associated with a change of a feature from the first image to the second image.

10. The method of claim 7 wherein the obtaining a third image further comprises masking at least a third part of the third image, the at least a third part free from information associated with the first state and the second state.

11. The method of claim 10 wherein the at least a third part is based on at least information associated with a change of a feature from the first image to the second image.

12. A computer-readable medium including instructions for processing an image of a microfluidic device, the computer-readable medium comprising:
one or more instructions for receiving a first image of a microfluidic device, the first image corresponding to a first state;

one or more instructions for receiving a second image of the microfluidic device, the second image corresponding to a second state;
one or more instructions for transforming the first image into a third coordinate space, the transforming using at least a first fiducial on the first image;
one or more instructions for transforming the second image into the third coordinate space, the transforming using at least a second fiducial on the second image;
one or more instructions for obtaining a third image based on at least information associated with the transformed first image and the transformed second image;
one or more instructions for processing the third image to obtain information associated with the first state and the second state.

13. The computer-readable medium of claim 12, the computer-readable medium further comprising:
one or more instructions for locating the at least a first fiducial on the first image;
one or more instructions for locating the at least a second fiducial on the second image.

14. The computer-readable medium of claim 12 wherein the one or more instructions for transforming the first image into a third coordinate space comprises:
one or more instructions for associating the at least a first fiducial to at least a third fiducial in the third coordinate space;
one or more instructions for performing a first transformation to the first image based on at least information associated with the at least a first fiducial and the at least a third fiducial.

15. The computer-readable medium of claim 14 wherein the one or more instructions for performing a first transformation comprises:
one or more instructions for estimating the first transformation based on at least information associated with the at least a first fiducial and the at least a third fiducial;
one or more instructions for converting the first image into the third coordinate space, the converting using the first transformation.

16. The computer-readable medium of claim 15 wherein the one or more instructions for transforming the second image into the third coordinate space comprises:
one or more instructions for associating the at least a second fiducial to the at least a third fiducial in the third coordinate space;
one or more instructions for performing a second transformation to the second image based on at least information associated with the at least a second fiducial and the at least a third fiducial.

17. The computer-readable medium of claim 16 wherein the one or more instructions for performing a second transformation comprises:
one or more instructions for estimating the second transformation based on at least information associated with the at least a second fiducial and the at least a third fiducial;
one or more instructions for converting the second image into the third coordinate space, the converting using the second transformation.

18. The computer-readable medium of claim 12 wherein the one or more instructions for obtaining a third image comprises:
one or more instructions for obtaining a difference between the first image and the second image.

19. The computer-readable medium of claim 18 wherein the one or more instructions for obtaining a third image further comprises:
one or more instructions for masking at least a first part of the first image, the at least a first part free from information associated with the first state;
one or more instructions for masking at least a second part of the second image, the at least a second part free from information associated with the second state.

20. The computer-readable medium of claim 19 wherein the at least a second part corresponds to the at least a first part, the at least a second part based on at least information associated with a change of a feature from the first image to the second image.

21. The computer-readable medium of claim 18 wherein the one or more instructions for obtaining a third image further comprises one or more instructions for masking at least a third part of the third image, the at least a third part free from information associated with the first state and the second state.

22. The computer-readable medium of claim 21 wherein the at least a third part is based on at least information associated with a change of a feature from the first image to the second image.

23. The method of claim 1 wherein the first state is different from the second state.

24. The method of claim 1 wherein the first state is the same as the second state.

25. The method of claim 1 wherein the first state is associated with absence of crystallization.

26. The method of claim 25 wherein the second state is associated with presence of crystallization.

27. The method of claim 25 wherein the second state is associated with absence of crystallization.

28. The computer-readable medium of claim 12 wherein the first state is different from the second state.

29. The computer-readable medium of claim 12 wherein the first state is the same as the second state.

30. The computer-readable medium of claim 12 wherein the first state is associated with absence of crystallization.

31. The computer-readable medium of claim 30 wherein the second state is associated with presence of crystallization.

32. The computer-readable medium of claim 30 wherein the second state is associated with absence of crystallization.

33. The method of claim 1 wherein:
the first image comprises a first chamber region associated with a first chamber boundary;
the second image comprises a second chamber region associated with a second chamber boundary;
the obtaining a third image comprises determining an implosion padding based on information associated with the first image and the second image.

34. The method of claim 33 wherein the determining an implosion padding comprises:
processing information associated with the first image;
determining a first index related to a first implosion associated with the first chamber boundary based on at least information associated with the first image;
processing information associated with the second image;
determining a second index related to a second implosion associated with the second chamber boundary based on at least information associated with the second image;
processing information associated with the first index and the second index;
determining the implosion padding based on at least information associated with the first index and the second index.

35. The method of claim 34 wherein the determining a first index related to a first implosion comprises:
selecting a plurality of image areas, the plurality of image areas associated with a plurality of boundaries respectively;
determining a plurality of median intensities associated with the plurality of boundaries respectively;
processing information associated with the plurality of median intensities;
determining the first index based on at least information associated with the plurality of median intensities.

36. The method of claim 35 wherein the determining the first index based on at least information associated with the plurality of median intensities comprises:
determining a minimum intensity from the plurality of median intensities, the minimum intensity being associated with one of the plurality of boundaries;
determining the first index based on at least information associated with the one of the plurality of boundaries.

37. The computer-readable medium of claim 12 wherein:
the first image comprises a first chamber region associated with a first chamber boundary;
the second image comprises a second chamber region associated with a second chamber boundary;
the one or more instructions for obtaining a third image comprises one or more instructions for determining an implosion padding based on information associated with the first image and the second image.

38. The method of claim 37 wherein the one or more instructions for determining an implosion padding comprises:
one or more instructions for processing information associated with the first image;
one or more instructions for determining a first index related to a first implosion associated with the first chamber boundary based on at least information associated with the first image;
one or more instructions for processing information associated with the second image;
one or more instructions for determining a second index related to a second implosion associated with the second chamber boundary based on at least information associated with the second image;
one or more instructions for processing information associated with the first index and the second index;
one or more instructions for determining the implosion padding based on at least information associated with the first index and the second index.

39. The computer-readable medium of claim 38 wherein the one or more instructions for determining a first index related to a first implosion comprises:
one or more instructions for selecting a plurality of image areas, the plurality of image areas associated with a plurality of boundaries respectively;
one or more instructions for determining a plurality of median intensities associated with the plurality of boundaries respectively;
one or more instructions for processing information associated with the plurality of median intensities;
one or more instructions for determining the first index based on at least information associated with the plurality of median intensities.

40. The computer-readable medium of claim 39 wherein the one or more instructions for determining the first index based on at least information associated with the plurality of median intensities comprises:

one or more instructions for determining a minimum intensity from the plurality of median intensities, the minimum intensity being associated with one of the plurality of boundaries;

determining the first index based on at least information associated with the one of the plurality of boundaries.

* * * * *

UNITED STATES PATENT AND TRADEMARK OFFICE
CERTIFICATE OF CORRECTION

PATENT NO.       : 7,583,853 B2                                    Page 1 of 1
APPLICATION NO.  : 10/902494
DATED            : September 1, 2009
INVENTOR(S)      : Taylor et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1242 days.

Signed and Sealed this

Fourteenth Day of September, 2010

David J. Kappos
*Director of the United States Patent and Trademark Office*